US010664926B2

(12) United States Patent
Wang et al.

(10) Patent No.: US 10,664,926 B2
(45) Date of Patent: May 26, 2020

(54) METHODS, SYSTEMS AND COMPUTER PROGRAM PRODUCTS FOR GENERATING AND PRESENTING EXPLANATIONS FOR TAX QUESTIONS

(71) Applicant: INTUIT INC., Mountain View, CA (US)

(72) Inventors: Gang Wang, San Diego, CA (US); Kevin M. McCluskey, Carlsbad, CA (US); Sasha Mikhael Perez, Del Mar, CA (US); Jennifer L. Keenan, San Diego, CA (US); Michael J. Graves, Sunnyvale, CA (US); Arien C. Ferrell, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 573 days.

(21) Appl. No.: 15/335,326

(22) Filed: Oct. 26, 2016

(65) Prior Publication Data

US 2018/0114275 A1    Apr. 26, 2018

(51) Int. Cl.
*G06Q 40/00*    (2012.01)
*G06F 40/30*    (2020.01)
(Continued)

(52) U.S. Cl.
CPC ......... *G06Q 40/123* (2013.12); *G06F 40/205* (2020.01); *G06F 40/30* (2020.01);
(Continued)

(58) Field of Classification Search
CPC .................................................. G06Q 40/123
(Continued)

(56) References Cited

U.S. PATENT DOCUMENTS 4,213,251 A    7/1980  Foundos
4,809,219 A    2/1989  Ashford et al.
(Continued)

FOREIGN PATENT DOCUMENTS

JP    2002-117121 A    4/2002
JP    2005-190425 A    7/2005
(Continued)

OTHER PUBLICATIONS

U.S. Appl. No. 14/553,347, filed Nov. 25, 2014.
(Continued)

*Primary Examiner* — Jessica Lemieux
(74) *Attorney, Agent, or Firm* — DLA Piper LLP (US)

(57) ABSTRACT

A system for explaining added tax questions resulting from modified tax data for an electronic tax return preparation program includes a computing device having a completeness graph engine, an explanation engine, and a user interface controller. The computing device executes the completeness graph engine, which takes a first snapshot of input needs for a completeness graph corresponding to a tax topic, takes a second snapshot of input needs for the completeness graph corresponding to the tax topic after receiving modified tax data, and compares the first and second snapshots to identify an added variable in the completeness graph. An explanation engine analyzes the completeness graph and the modified tax data to generate an explanation asset for the added variable. A user interface controller generates a tax question corresponding to the added variable. The computing device presents the tax question and the explanation asset to a user.

20 Claims, 19 Drawing Sheets

(51) Int. Cl.
*G06F 40/205* (2020.01)
*G06F 40/186* (2020.01)
*G06F 3/0481* (2013.01)
*G06F 3/0484* (2013.01)

(52) U.S. Cl.
CPC ...... *G06F 3/04817* (2013.01); *G06F 3/04842* (2013.01); *G06F 40/186* (2020.01)

(58) Field of Classification Search
USPC .......................................................... 705/31
See application file for complete search history.

(56) References Cited

U.S. PATENT DOCUMENTS

| | | |
|---|---|---|
| 5,006,998 A | 4/1991 | Yasunobu |
| 5,495,607 A | 2/1996 | Pisello et al. |
| 5,557,761 A | 9/1996 | Chan et al. |
| 5,673,369 A | 9/1997 | Kim |
| 5,742,836 A | 4/1998 | Turpin et al. |
| 5,819,249 A | 10/1998 | Dohanich |
| 6,078,898 A | 6/2000 | Davis |
| 6,535,883 B1 | 3/2003 | Lee et al. |
| 6,601,055 B1 | 7/2003 | Roberts |
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 | 2/2004 | Miller |
| 6,898,573 B1 | 5/2005 | Piehl |
| 6,910,003 B1 | 6/2005 | Arnold |
| 6,912,508 B1 | 6/2005 | McCalden |
| 7,062,466 B2 | 6/2006 | Wagner |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison et al. |
| 7,716,094 B1 | 5/2010 | Sutter et al. |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson et al. |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1 * | 12/2011 | Brown .................. G06F 17/243 379/201.1 |
| 8,086,970 B2 | 12/2011 | Achtermann et al. |
| 8,108,258 B1 | 1/2012 | Slattery |
| 8,126,820 B1 | 2/2012 | Talan |
| 8,156,025 B1 | 4/2012 | Gymer |
| 8,190,499 B1 | 5/2012 | McVickar |
| 8,191,152 B1 | 5/2012 | Grinberg |
| 8,204,768 B1 | 6/2012 | Eftekhari |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,321,312 B2 | 11/2012 | Allanson et al. |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 | 3/2013 | Eftekhari et al. |
| 8,417,596 B1 | 4/2013 | Dunbar et al. |
| 8,417,597 B1 | 4/2013 | McVickar |
| 8,423,433 B1 | 4/2013 | Miller |
| 8,447,667 B1 | 5/2013 | Dinamani et al. |
| 8,452,676 B1 | 5/2013 | Talan |
| 8,463,676 B1 | 6/2013 | Dinamani et al. |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Ohm |
| 8,560,409 B2 | 10/2013 | Abeles |
| 8,577,760 B2 | 11/2013 | Rutsch et al. |
| 8,583,516 B1 | 11/2013 | Pitt |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,892,467 B1 | 11/2014 | Ball |
| 8,949,270 B2 | 2/2015 | Newton et al. |
| 9,117,118 B1 | 8/2015 | Lewis |
| 9,372,687 B1 | 6/2016 | Pai |
| 9,406,089 B2 | 8/2016 | Mori |
| 9,524,525 B2 | 12/2016 | Manyam |
| 9,690,854 B2 | 6/2017 | Stent et al. |
| 9,760,953 B1 | 9/2017 | Wang et al. |
| 9,916,628 B1 | 3/2018 | Wang et al. |
| 9,922,376 B1 | 3/2018 | Wang et al. |
| 9,990,678 B1 | 6/2018 | Cabrera et al. |
| 10,096,072 B1 | 10/2018 | Ali |
| 10,140,666 B1 | 11/2018 | Wang |
| 10,157,426 B1 | 12/2018 | Wang |
| 10,169,826 B1 | 1/2019 | Wang |
| 10,176,534 B1 | 1/2019 | Mascaro |
| 10,204,382 B2 | 2/2019 | Morin |
| 2002/0022986 A1 | 2/2002 | Coker |
| 2002/0023064 A1 | 2/2002 | Grimse |
| 2002/0065831 A1 | 5/2002 | DePaolo |
| 2002/0107698 A1 | 8/2002 | Brown et al. |
| 2002/0111888 A1 | 8/2002 | Stanley et al. |
| 2002/0133410 A1 | 9/2002 | Hermreck |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah et al. |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2004/0230397 A1 | 11/2004 | Chadwick |
| 2005/0171822 A1 | 8/2005 | Cagan |
| 2005/0216379 A1 | 9/2005 | Ozaki |
| 2005/0228685 A1 | 10/2005 | Schuster |
| 2005/0262191 A1 | 11/2005 | Mamou et al. |
| 2006/0112114 A1 | 5/2006 | Yu |
| 2006/0155618 A1 | 7/2006 | Wyle |

(56) References Cited

U.S. PATENT DOCUMENTS

| | | |
|---|---|---|
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1 | 3/2007 | Fox et al. |
| 2007/0094207 A1 | 4/2007 | Yu |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0189197 A1 | 8/2008 | Allanson et al. |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0192827 A1 | 7/2009 | Andersen |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendori et al. |
| 2010/0100561 A1 | 4/2010 | Cooper |
| 2010/0131394 A1 | 5/2010 | Rutsch et al. |
| 2010/0153138 A1 | 6/2010 | Evans |
| 2010/0169359 A1 | 7/2010 | Barrett |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258213 A1 | 10/2011 | Pollara |
| 2011/0258610 A1 | 10/2011 | Aaraj et al. |
| 2011/0264569 A1 | 10/2011 | Houseworth |
| 2011/0284213 A1 | 11/2011 | Kowalewski |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1* | 5/2012 | Eftekhari ............... G06F 21/31 705/31 |
| 2012/0109793 A1 | 5/2012 | Abeles |
| 2012/0136764 A1 | 5/2012 | Miller |
| 2012/0278365 A1 | 11/2012 | Labat et al. |
| 2013/0030839 A1 | 1/2013 | Opfer |
| 2013/0036347 A1 | 2/2013 | Eftekhari |
| 2013/0080302 A1 | 3/2013 | Allanson |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0058763 A1 | 2/2014 | Zizzamia |
| 2014/0067949 A1 | 3/2014 | Dearlove |
| 2014/0108213 A1 | 4/2014 | Houseworth |
| 2014/0149303 A1 | 5/2014 | Band |
| 2014/0172656 A1 | 6/2014 | Shaw |
| 2014/0201045 A1 | 7/2014 | Pat et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade et al. |
| 2015/0066715 A1 | 3/2015 | Carrier |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0162459 A1 | 6/2016 | Parker |
| 2016/0247239 A1 | 8/2016 | Houseworth |
| 2016/0275627 A1 | 9/2016 | Wang |
| 2016/0283353 A1 | 9/2016 | Owen |
| 2017/0004583 A1 | 1/2017 | Wang |
| 2017/0004584 A1 | 1/2017 | Wang |
| 2017/0032468 A1 | 2/2017 | Wang et al. |
| 2017/0046492 A1 | 2/2017 | Renner |
| 2018/0032855 A1 | 2/2018 | Wang et al. |

FOREIGN PATENT DOCUMENTS

| | | | |
|---|---|---|---|
| JP | 2014-206960 A | | 10/2014 |
| KR | 10-2012-0011987 A | | 2/2012 |
| WO | 2017/004094 A1 | | 1/2017 |
| WO | 2017004095 A1 | | 1/2017 |
| WO | 2017019233 A1 | | 2/2017 |
| WO | 2017116496 A1 | | 7/2017 |
| WO | 2017116497 A1 | | 7/2017 |
| WO | 2018022023 A1 | | 2/2018 |
| WO | 2018022128 A1 | | 2/2018 |
| WO | 2018/080562 A1 | | 5/2018 |
| WO | 2018/080563 A1 | | 5/2018 |

OTHER PUBLICATIONS

U.S. Appl. No. 14/673,261, filed Mar. 30, 2015.
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).

(56) References Cited

OTHER PUBLICATIONS

PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Nang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/462,411 dated May 8, 2018, (27pages).
Response for U.S. Appl. No. 14/555,334 dated Apr. 4, 2018, (14pages).

(56) References Cited

OTHER PUBLICATIONS

Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Communication pursuant to Rules 70(2) and 70a(2) EPC dated Apr. 25, 2018 in European Patent Application No. 16843282.1-1217, (1page).
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, dated Jan. 11, 2018, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, dated Jan. 11, 2018, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015,(52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).

(56) References Cited

OTHER PUBLICATIONS

Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Office Action dated Sep. 14, 2017 in U.S. Appl. No. 14/530,159, (41pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).

(56) References Cited

OTHER PUBLICATIONS

Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Vanderbilt University, "Free tax prep help available for Vanderbilt employees", Feb. 6, 2014, Vanderbilt University, p. 1-3 [NPL-1].
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.

http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports--graphs-and-snapshots/track-the-earnings—taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.

(56) References Cited

OTHER PUBLICATIONS

Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Six, Janet M., "Going Mobile: Designing for Different Screen Sizes Promoting Your Mobile App" https://www.uxmatters.com/mt/archives/2010/10/going-mobile-designing-for-different-screen-sizes-promoting-your-mobile-app.php, 2010.
U.S. Appl. No. 14/673,261, filed Mar. 30, 2015 Dec. 5, 2019 (Sep. 6, 2019—present).
U.S. Appl. No. 15/221,511, filed Jul. 27, 2016 Dec. 5, 2019 (Sep. 6, 2019—present).
U.S. Appl. No. 15/221,495, filed Jul. 27, 2016 Dec. 5, 2019 (Sep. 6, 2019—present).
U.S. Appl. No. 15/221,471, filed Jul. 27, 2016 Dec. 5, 2019 (Sep. 6, 2019—present).
U.S. Appl. No. 15/221,520, filed Jul. 27, 2016 Dec. 5, 2019 (Sep. 6, 2019—present).
U.S. Appl. No. 15/335,294, filed Oct. 26, 2016 Dec. 5, 2019 (Sep. 6, 2019—present).
U.S. Appl. No. 14/553,347, filed Nov. 25, 2014 (Jul. 22, 2019—present).
U.S. Appl. No. 14/673,261, filed Mar. 30, 2015 (Jul. 22, 2019—present).
U.S. Appl. No. 16/226,507, filed Dec. 19, 2018 (Jul. 22, 2019—present).
U.S. Appl. No. 14/530,159, filed Oct. 31, 2014.
U.S. Appl. No. 15/221,471, filed Jul. 27, 2016.
U.S. Appl. No. 16/454,671, filed Jun. 27, 2019.
U.S. Appl. No. 16/226,507, filed Dec. 19, 2018.
U.S. Appl. No. 15/221,495, filed Jul. 27, 2016.
U.S. Appl. No. 15/335,294, filed Oct. 26, 2016.
U.S. Appl. No. 15/221,511, filed Jul. 27, 2016.
U.S. Appl. No. 15/221,520, filed Jul. 27, 2016.

* cited by examiner

| | Rule₁ 32a | Rule₂ 32b | Rule₃ 32c | Rule₄ 32d | Rule₅ 32e |
|---|---|---|---|---|---|
| Q_A (34a) | Y | Y | N | N | N |
| Q_B (34b) | ? | ? | Y | Y | N |
| Q_C (34c) | N | Y | ? | ? | ? |
| Q_D (34d) | ? | ? | ? | ? | N |
| Q_E (34e) | ? | ? | Y | N | ? |
| Q_F (34f) | ? | ? | ? | N | N |
| Q_G (34g) | ? | Y | Y | ? | ? |
| Goal (34h) | Yes | Yes | Yes | Yes | Yes |

FIG. 8

Transform → FIG. 12

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule$_1$ | Y | ? | ? | ? | N | ? | ? | 40% | 10% |
| Rule$_2$ | N | Y | Y | ? | ? | ? | N | 20% | 5% |
| Rule$_3$ | N | Y | N | Y | ? | N | ? | 14% | 6% |
| Rule$_4$ | Y | ? | ? | ? | N | Y | N | 65% | 20% |
| Rule$_5$ | N | Y | N | ? | ? | ? | Y | 18% | 40% |
| Rule$_6$ | Y | Y | N | ? | ? | N | ? | 5% | 25% |

FIG. 9

METHODS, SYSTEMS AND COMPUTER PROGRAM PRODUCTS FOR GENERATING AND PRESENTING EXPLANATIONS FOR TAX QUESTIONS

This application includes subject matter similar to the subject matter described in the following co-owned applications: (1) Ser. No. 15/221,520, filed Jul. 27, 2016, entitled "METHODS, SYSTEMS AND COMPUTER PROGRAM PRODUCTS FOR GENERATING EXPLANATIONS FOR CHANGES IN BENEFIT QUALIFICATION STATUS"; (2) Ser. No. 14/553,347, filed Nov. 25, 2014, entitled "SYSTEMS AND METHODS FOR ANALYZING AND GENERATING EXPLANATIONS FOR CHANGES IN TAX RETURN RESULTS"; (3) Ser. No. 14/673,261, filed Mar. 30, 2015, entitled "SYSTEM AND METHOD FOR GENERATING EXPLANATIONS FOR YEAR-OVER-YEAR TAX CHANGES; (4) Ser. No. 14/529,736, filed Oct. 31, 2014, entitled "SYSTEMS AND METHODS FOR DETERMINING IMPACT CHAINS FROM A TAX CALCULATION GRAPH OF A TAX PREPARATION SYSTEM"; (5) Ser. No. 14/530,159, filed Oct. 31, 2014, entitled "SYSTEM AND METHOD FOR GENERATING EXPLANATIONS FOR TAX CALCULATIONS"; and (6) Ser. No. 15/335,294, filed Oct. 26, 2016, entitled "METHODS, SYSTEMS AND COMPUTER PROGRAM PRODUCTS FOR GENERATING AND PRESENTING EXPLANATIONS FOR TAX QUESTIONS." The contents of the above-mentioned applications are fully incorporated herein by reference as though set forth in full.

SUMMARY

Embodiments are directed to systems, computer-implemented methods, and computer program products for generating and presenting explanations for electronic tax return preparation systems.

In one embodiment, a computer-implemented method for explaining added tax questions resulting from modified tax data for an electronic tax return preparation program includes a computing device executing a completeness graph engine, the completeness graph engine taking a first snapshot of input needs for a completeness graph corresponding to a tax topic. The completeness graph engine also takes a second snapshot of input needs for the completeness graph corresponding to the tax topic after receiving modified tax data. The completeness graph engine further compares the first and second snapshots to identify an added variable in the completeness graph corresponding to the tax topic. Moreover, the completeness graph engine sends the added variable to an explanation engine and a user interface controller. The method also includes explanation engine analyzing the completeness graph and the modified tax data to generate an explanation asset for the added variable. The method further includes the user interface controller generating a tax question corresponding to the added variable. Moreover, the method includes the computing device presenting the tax question and the explanation asset to a user.

In another embodiment, a system for explaining added tax questions resulting from modified tax data for an electronic tax return preparation program includes a computing device having a completeness graph engine, an explanation engine, and a user interface controller. The computing device executes the completeness graph engine, the completeness graph engine taking a first snapshot of input needs for a completeness graph corresponding to a tax topic. The completeness graph engine also takes a second snapshot of input needs for the completeness graph corresponding to the tax topic after receiving modified tax data. The completeness graph engine further compares the first and second snapshots to identify an added variable in the completeness graph corresponding to the tax topic. Moreover, the completeness graph engine sends the added variable to an explanation engine and a user interface controller. The explanation engine analyzes the completeness graph and the modified tax data to generate an explanation asset for the added variable. The user interface controller generates a tax question corresponding to the added variable. The computing device presents the tax question and the explanation asset to a user.

In one or more embodiments, generating the explanation asset includes analyzing the completeness graph, the modified tax data, and the added variable. The completeness graph may be a logical tree, and the added variable may be represented by a node in the logical tree. The explanation asset may be indexed to the node in the logical tree.

In one or more embodiments, the explanation asset is a natural language phrase. The explanation asset may be a template including another variable. Presenting the explanation asset may include presenting a user interface object selectable to trigger displaying the explanation asset. Presenting the explanation asset may include displaying the explanation asset without user input. The first snapshot may be taken when the user exits the tax topic. The second snapshot may be taken when the user enters the tax topic after exiting the tax topic.

In still another embodiment, a computer-implemented method for explaining added tax questions resulting from modified tax data for an electronic tax return preparation program includes a computing device receiving modified tax data. The method also includes the computing device executing a completeness graph engine, the completeness graph engine analyzing a completeness graph corresponding to a tax topic to identify an additional required variable. The completeness graph engine also sends the additional required variable to an explanation engine and a user interface controller. The method further includes the explanation engine analyzing the completeness graph and the modified tax data to generate an explanation asset for the additional required variable. Moreover, the method includes the user interface controller generating a tax question corresponding to the variable. In addition, the method includes the computing device presenting the tax question and the explanation asset to a user.

In yet another embodiment, a system for explaining added tax questions resulting from modified tax data for an electronic tax return preparation program includes a computing device having a completeness graph engine, an explanation engine, and a user interface controller. The computing device receives modified tax data. The computing device executes the completeness graph engine, the completeness graph engine analyzing a completeness graph corresponding to a tax topic to identify an additional required variable. The completeness graph engine also sends the additional required variable to an explanation engine and a user interface controller. The explanation engine analyzes the completeness graph and the modified tax data to generate an explanation asset for the additional required variable. The user interface controller generates a tax question corresponding to the variable. The computing device presents the tax question and the explanation asset to a user.

In one or more embodiments, generating the explanation asset includes analyzing the completeness graph, the modified tax data, and the additional required variable. The completeness graph may be a logical tree, and the additional required variable may be represented by a node in the logical tree. The explanation asset may be indexed to the node in the logical tree.

In one or more embodiments, the explanation asset is a natural language phrase. The explanation asset may be a template including another variable. Presenting the explanation asset may include presenting a user interface object selectable to trigger displaying the explanation asset. Presenting the explanation asset may include displaying the explanation asset without user input. The completeness graph may have been completed before receiving the modified tax data.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIG. 8 illustrates a decision table based on or derived from the completeness graph illustrated in FIG. 7.

FIG. 9 illustrates another embodiment of a decision table that incorporates statistical data.

Figure 1:
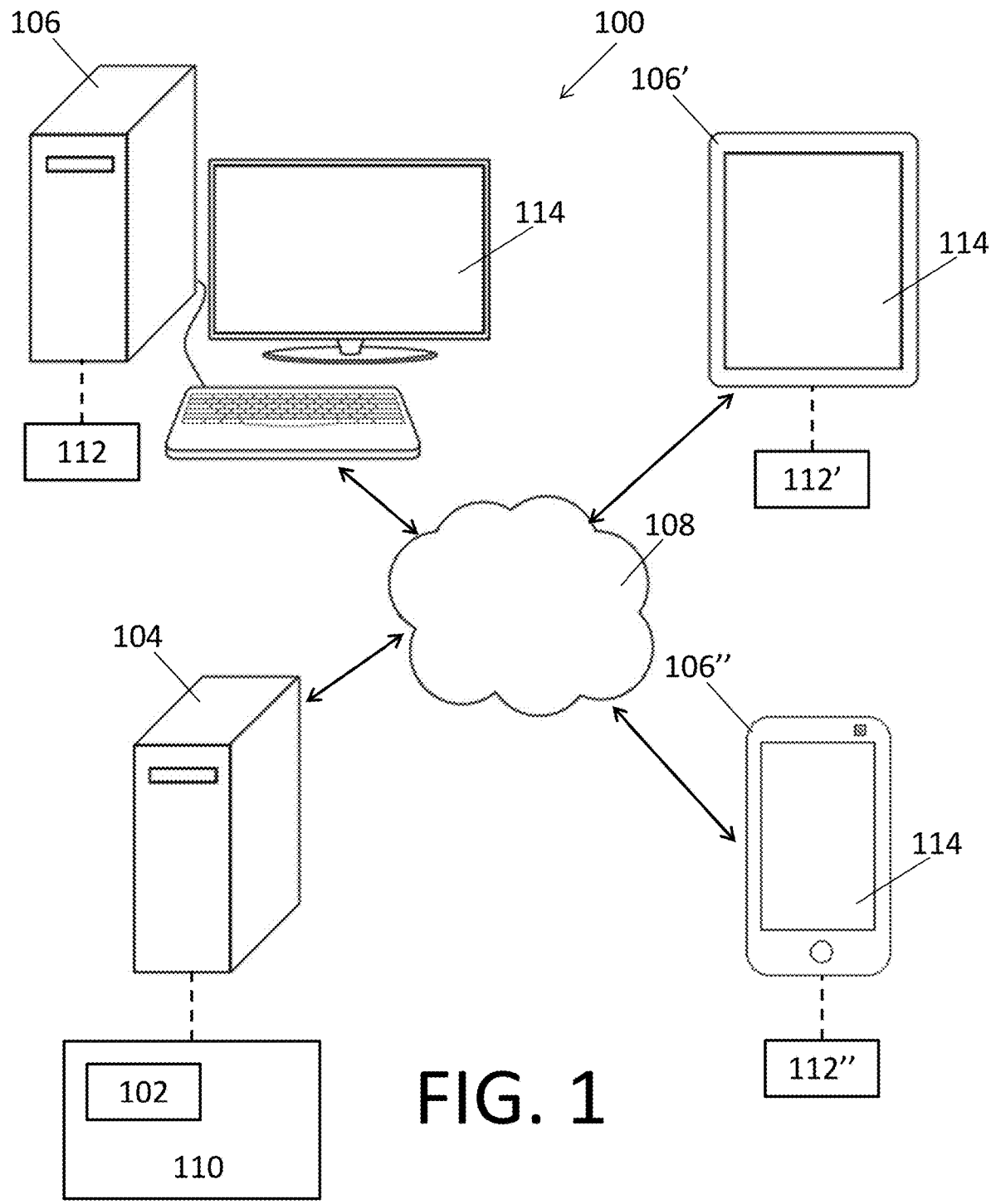
FIGS. 1 and 2 are schematic diagrams illustrating the implementation of explanation generation systems on computing devices according to two embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Embodiments describe methods, systems and articles of manufacture for generating an explanation for an electronic tax return preparation system. In particular, some embodiments describe a computing device executing an explanation generation system, which operates on a completeness graph to generate explanations for tax questions posed to an end user and present the generated explanations to an end user. The explanation generation system identifies tax questions/variables that may raise questions for an end user. Then, the explanation generation system generates a textual explanation for the tax question/variable. Next, the explanation generation system presents the textual explanation to the end user.

In a typical interview-based electronic tax return preparation experience, the electronic tax return preparation system presents many tax questions. Depending on the taxpayer's tax data and the particular tax topic, the need for/purpose of certain tax questions may not be intuitive. Such tax questions are examples of tax questions for which an explanation may improve the user experience.

For example, when determining the tax consequence of the Affordable Care Act, the taxpayer's zip code (e.g., a variable) is required to benchmark the health insurance cost in the area including the taxpayer's residence. The impact of a taxpayer's zip code in benchmarking determination is roughly described below.

1) There is a database that records the costs of different health insurance plan types and configurations, which can be sorted and searched by the zip codes in which the plans are offered.
2) These health insurance plans are also classified by their caliber (i.e., gold, silver, bronze, etc.)
3) The cost of the second most expensive health insurance plan offered in the tax payer's zip code is used as a benchmark for calculating tax consequences of the Affordable Car Act.

For users not familiar with the intricacies of calculating tax consequences of the Affordable Car Act, a request to provide a zip code may seem to be misplaced and/or unreasonable. Being asked to answer seemingly misplaced and/or unreasonable questions may cause the user/taxpayer to experience fear, uncertainty and doubt, which may result in the user/taxpayer lose confidence in or abandoning the electronic tax return preparation process. However, it is perhaps unnecessary to provide every detail regarding seemingly misplaced and/or unreasonable questions (as detailed above for the zip code and the Affordable Care Act). However, a simple explanation such as "Your zip code is needed to correctly benchmark the health care cost in your area," may satisfactorily explain why a seemingly misplaced/unreasonable question is presented to the user/taxpayer.

The embodiments described herein provide an explanation as to why a specific question is asked for a specific tax topic. The embodiments tie a completeness analysis result with a set of explanation assets (e.g., textual explanations) such that a user specific explanation is presented when a tax question is asked.

There are many tax questions that may appear misplaced/unreasonable when present during tax data collection for specific tax topics. For instance, during tax data collection for determining whether a child qualifies as a dependent child, certain tax data situations will result in the user/taxpayer being asked whether the child is under 24 years of age at the end of the year and a full time student. Further, the tax payer's age may be collected for various tax topics for which age appears to be misplaced/unreasonable, including Earned Income Tax Credit qualification, 401K retirement plan contribution limits and social security benefits.

As more tax questions that require an explanation are presented to a user/taxpayer, the user/taxpayer experiences more fear, uncertainty and doubt, which may increase the likelihood that the user/taxpayer will abandon the electronic tax return preparation process.

Some embodiments described herein involve identifying variables in tax topic completeness graphs that could benefit from explanations regarding the need for the variables in the respective tax topics. The explanations are generated and indexed to the variable and the tax topic completeness graph. Some embodiments operate on tax topic completeness graphs to identify questions/variables indexed to explanation assets. The explanation assets are presented to the user/taxpayer along with respective questions. Presenting explanation assets to the user/taxpayer addresses fear, uncertainty and doubt associated with appropriate questions before the negative psychological impact of the questions can negatively affect the user experience. In fact, anticipating and addressing the user/taxpayer's fear, uncertainty and doubt can improve the user experience by humanizing and personalizing the experience, and projecting concern for the user/taxpayer's peace of mind. Improving the user experience, in turn, increases the likelihood that a user/taxpayer will complete the electronic tax return preparation experience.

The embodiments described herein facilitate efficient and effective electronic tax return preparation by providing explanations for tax questions asked in the context of a tax return preparation experience. Some users/taxpayers experience increased anxiety when presented with tax questions because the answers to those tax questions include personal, financial, private and/or confidential information. For instance, some tax questions may increase user anxiety because they are seemingly misplaced or unreasonable in the context a particular tax topic (e.g., a user's ZIP code is required by determining the tax consequences of the Affordable Care Act). The explanations provided by the embodiments herein reduce user anxiety associated with providing personal information to an electronic tax return preparation system, by conceptually connecting the personal information to the goal of preparing a tax return.

The embodiments modify data structures (e.g., completeness graphs) by indexing explanation assets to those data structures to increase computer system efficiency when providing explanations. The embodiments also provide modified user interfaces to more efficiently and effective collect tax data for electronic tax return preparation.

When user tax data is modified, additional tax questions may need answers. This is especially problematic when those additional tax questions appear in tax topics for which the user has already completed data entry. Reopening previously completed tax topics may lead to user fear, uncertainty and doubt. Embodiments described herein address this issue by generating and presenting explanations for these additional tax questions.

As used in this application, a "directed graph" includes, but is not limited to a data structure including a plurality of functional vertices or nodes connected by one of a plurality of edges, arcs or lines, where each edge, arc or line has a direction. Each node may represent a data store, function, decision point, table, etc. Each edge, arc or line may represent a functional relationship between the connected pair of nodes. As used in this application, a "completeness graph" or "completion graph" includes, but is not limited to, a directed graph where each node is related to tax data required to make a determination related to a tax topic. The determination may be a state of completeness for the tax topic. As used in this application, "satisfying a completeness graph" includes, but is not limited to, providing tax data related to the nodes of a completeness graph such that traversing the completeness graph results in a determination that the taxpayer corresponding to the tax data qualifies for (i.e., to receive a deduction) the tax concept corresponding to the completeness graph. As used in this application, a "decision table," includes, but is not limited to, a tabular representation of a data structure including one axis (e.g., rows) representing paths of completion through a corresponding completeness graph, and another axis (e.g., columns) representing questions and respective answers. As used in this application, an "unanswered question in or for a completeness graph" includes, but is not limited to, an empty or undetermined node in the completeness graph.

As used in this application, a "preparer," "user" or "taxpayer" includes, but is not limited to, a person or entity preparing a tax. The "preparer," "user" or "taxpayer" may or may not be obligated to file the tax return. As used in this application, a "previous tax return" or "prior tax return" includes, but is not limited to, a tax return (in electronic or hard copy form) for a year before the current tax year. As used in this application, "tax data" includes, but is not limited to, information that may affect a user's tax burden, including information typically included in a tax return. As used in this application, "taxpayer data" includes, but is not limited to, information relating to a taxpayer, including, but not limited to, tax data. The terms "tax data" and "taxpayer data," as used in this application, also include, but are not limited to, partially or fully completed tax forms (electronic and hard copy) that include information typically included in a tax return. As used in this application, a "previously collected tax data" includes, but is not limited to, tax data that was previously collected (e.g., a previous year's tax data for the taxpayer).

As used in this application, "taxpayer data category" includes, but is not limited to, a generic class of tax data (e.g., mortgage interest paid, property tax paid, childcare expenses, business expenses, or other data categories that may be used to modify the tax liability of a taxpayer). As used in this application, "computer data sources" includes, but is not limited to, a source of data that can be accessed to provide data in the preparation of tax forms (e.g., lender for mortgage interest paid or county tax collector for property tax paid). As used in this application, "tax code," "tax regulation," and "tax rule," includes, but is not limited to, statutes, regulations, and rules relating to taxes in various jurisdictions (e.g., state and federal), including the United States of America and other jurisdictions around the world.

As used in this application, a "financial management system" includes, but is not limited to, software that oversees and governs an entity's (e.g. person, business entity, government) finances (e.g., income, expenses, assets, and liabilities). Exemplary financial management system include MINT Financial Management Software, QUICKEN, QUICKBOOKS, TURBOTAX, which are available from Intuit Inc. of Mountain View, Calif., MICROSOFT MONEY, which is available from Microsoft Corp. of Redmond, Wash., and YODLEE Financial Management Software, which is available from Yodlee, Inc. of Redwood City, Calif. A financial management system is executed to assist a user with managing its finances. As part of overseeing and governing an entity's finances, financial management systems may access financial transaction data stored in various user accounts including checking, savings, money market, credit card, stock, loan, mortgage, payroll or other types of user account. Such user accounts can be hosted at a financial institution such as a bank, a credit union, a loan services or a brokerage. Financial transaction data may include, for example, account balances, transactions (e.g., deposits, withdraws, and bill payments), debits, credit card transactions (e.g., for merchant purchases). Financial management systems can also obtain financial transaction data directly from a merchant computer or a point of sale terminal. Financial management systems can include financial transaction data aggregators that manage and organize financial transaction data from disparate sources. While certain embodiments are described with reference to MINT Financial Management Software, the embodiments described herein can include other financial management systems such as QUICKEN Financial Management Software, QUICKRECIPTS Financial Management Software, FINANCEWORKS Financial Management Software, MICROSOFT MONEY Financial Management Software, YODLEE Financial Management Software (available from Yodlee, Inc. of Redwood City, Calif.) and other financial management systems capable of providing a taxpayer's financial data to an electronic tax return preparation system.

As used in this application, "computer," "computer device," or "computing device" includes, but are not limited to, a computer (laptop or desktop) and a computer or computing device of a mobile communication device, smartphone and tablet computing device. As used in this application, "tax preparation system," "tax preparation computing device," "tax preparation computer," "tax preparation software," "tax preparation module," "tax preparation application," "tax preparation program," "tax return preparation system," "tax return preparation computing device," "tax return preparation computer," "tax return preparation software," "tax return preparation module," "tax return preparation application," or "tax return preparation program" includes, but are not limited to, one or more separate and independent software and/or hardware components of a computer that must be added to a general purpose computer before the computer can be used to prepare tax returns, and computers having such components added thereto.

As used in this application, "explanation generation system," "explanation generation computing device," "explanation generation computer," "explanation generation software," "explanation generation module," "explanation generation application," or "explanation generation program" includes, but are not limited to, one or more separate and independent software and/or hardware components of a computer that must be added to a general purpose computer before the computer can generate explanations for tax questions for electronic tax return preparation systems, and computers having such components added thereto.

As used in this application, "explanation generation engine," but is not limited to, one or more separate and independent software and/or hardware components of a computer that must be added to a general purpose computer before the computer can analyze and/or traverse a completeness graph including the variables in same to identify variables/questions that could benefit from an explanation and to formulate explanations for these variables/questions, and computers having such components added thereto.

As used in this application, "completeness graph comparison engine" includes, but is not limited to, one or more separate and independent software and/or hardware components of a computer that must be added to a general purpose computer before the computer can (1) generate snapshots of the empty variables in a completeness graph that need to be obtained before the completeness graph can be traversed to make a determination regarding the corresponding tax topic, (2) compare snapshots to identify added empty variables, (3) identify previously completed tax topics that have been rendered incomplete by a tax data change and (4) analyze completeness graphs to identify added empty variables in the previously completed completeness graphs, and computers having such components added thereto.

As used in this application, "server" or "server computer" includes, but is not limited to, one or more separate and independent software and/or hardware components of a computer that must be added to a general purpose computer before the computer can receive and respond to requests from other computers and software in order to share data, hardware, and/or software resources among the other computers and software, and computers having such components added thereto. As used in this application, "obtaining data" or "acquiring data" includes, but is not limited to, accessing data (e.g., from a database through a network) and generating data (e.g., using one or more hardware and software components).

As used in this application, "input/output module" or "input output module" includes, but is not limited to, one or more separate and independent software and/or hardware components of a computer that must be added to a general purpose computer before the computer can communicate with and facilitate the receipt and transfer of information, including schema, completeness graphs, calculation graphs, tax data and data relating to computer data sources, from and to other computers. As used in this application, "memory module" includes, but is not limited to, one or more separate and independent software and/or hardware components of a computer that must be added to a general purpose computer before the computer can store information, including schema, completeness graphs, calculation graphs, tax data and data relating to computer data sources. As used in this application, a "tax calculation engine" includes, but is not limited to, one or more separate and independent software and/or hardware components of a computer that must be added to a general purpose computer before the computer can manipulate tax data to operate on a completeness graph and/or a calculation graph. As used in this application, an "explanation engine" includes, but is not limited to, one or more separate and independent software and/or hardware components of a computer that must be added to a general purpose computer before the computer can generate a textual explanation corresponding to a variable in a completeness graph (e.g., a node of a completeness graph) or a question. As used in this application, a "natural language generator" includes, but is not limited to, one or more separate and independent software and/or hardware components of a computer that must be added to a general purpose computer before the computer can form a natural language textual explanation. As used in this application, a "user interface controller" includes, but is not limited to, one or more separate and independent software and/or hardware components of a computer that must be added to a general purpose computer before the computer can receive information from and send information to a user. As used in this application, "application programming interface" includes, but is not limited to, one or more separate and independent software and/or hardware components of a computer that must be added to a general purpose computer before the computer can receive information from and send information to a separate computer.

As used in this application, "website" includes, but is not limited to, one or more operatively coupled webpages. As used in this application, "browser" or "web browser" includes, but is not limited to, one or more separate and independent software and/or hardware components of a computer that must be added to a general purpose computer before the computer can receive, display and transmit resources from/to the World Wide Web.

FIG. 1 depicts an exemplary hardware system 100 in which an explanation generation system 102 according to one embodiment can operate. The hardware system 100 according to this embodiment includes a server computing device 104 and a plurality of user computing devices 106, 106', 106", which are all operatively coupled via a network 108. The server computing device 104 is a stationary computer. The user computing devices depicted in FIG. 1 include a stationary or desktop computer 106, a table computer 106', and a smartphone 106". Generally, user computing devices include a few common attributes (e.g., a processor, a memory, and the ability to communicate via network; see FIG. 4) housed in various form factors (e.g., desktop computer, laptop computer, tablet computer, smartphone, watch, or other computing devices comprising a processor, memory, and the ability to communicate with other computing devices via a network). The network 108 may be two or more networks depending on the system configuration and communication protocols employed. One or more or all of networks 108 may be, for example, a wireless or cellular network, a private communication network (e.g., mobile phone network), a Local Area Network (LAN), a Wide Area Network (WAN), and/or other technology capable of enabling one or more computing devices to communicate with one another. Reference to network 108 generally is not intended to refer to a specific network or communications protocol, and embodiments can be implemented using various networks 108 and combinations thereof.

In the embodiment depicted in FIG. 1, the explanation generation system 102 forms a part of an operatively coupled electronic tax return preparation system/program 110, both of which operate on the server computing device 104. Examples of tax return preparation systems 110 that may include and be operatively coupled to the explanation generation system 102 include desktop or online versions of TURBOTAX, PROSERIES, and LACERTE tax return preparation applications, available from Intuit Inc. TURBOTAX, PROSERIES AND LACERTE are registered trademarks of Intuit Inc., Mountain View Calif. Various web browser programs 112, 112', 112" operate on respective user computers 106, 106', 106" and access the explanation generation system 102 and the tax return preparation system 110 through the network 108.

The various computing devices 104, 106, 106', 106" may include visual displays or screens 114 operatively coupled thereto. In the embodiment depicted in FIG. 1, the user computing devices 106, 106', 106" includes a display or screen 114 through which respective users physically interface with the user computing devices 106, 106', 106" and the respective web browser programs 112, 112', 112" operating thereon.

Figure 2:
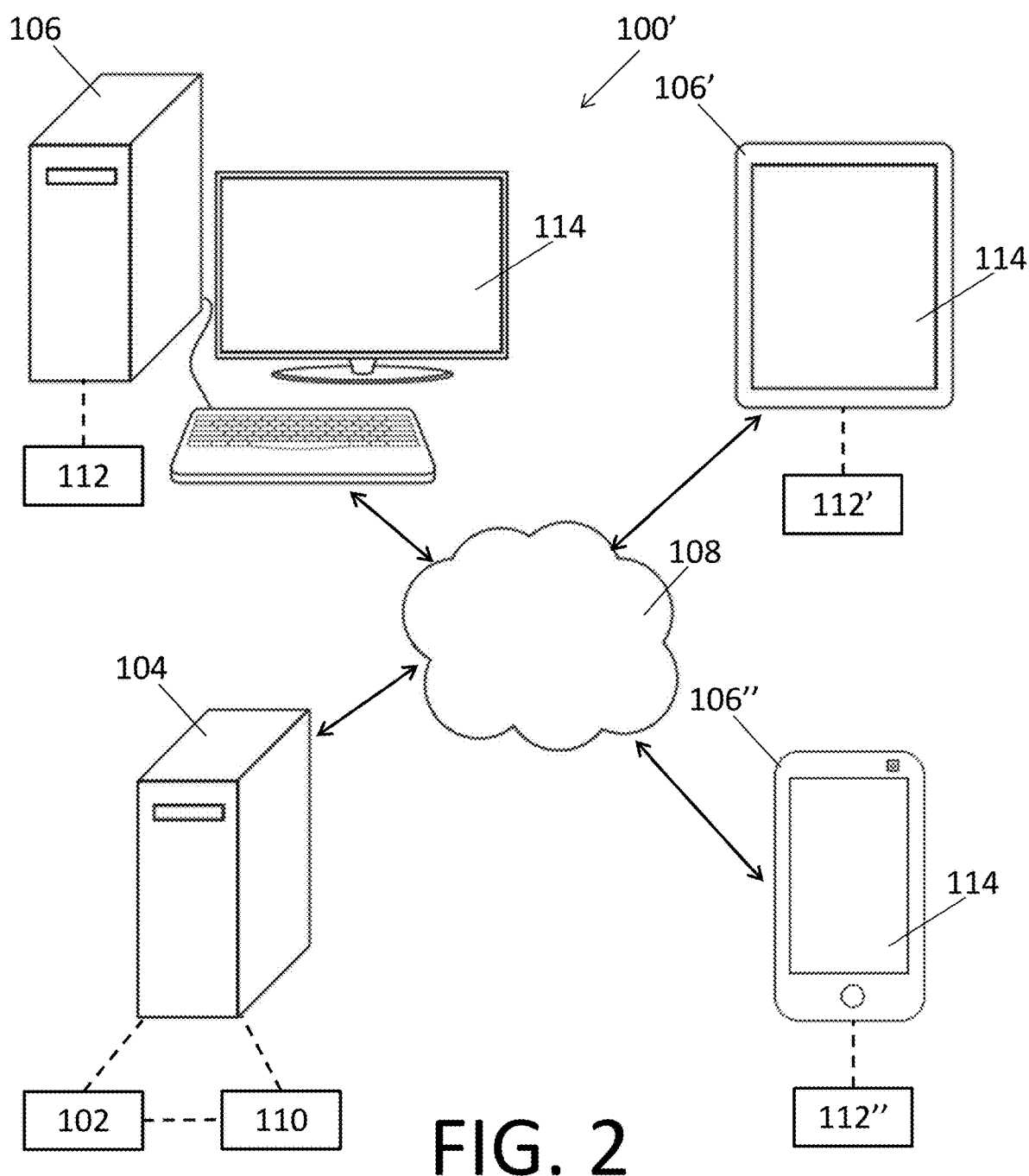

While the explanation generation system 102 depicted in FIG. 1 forms a part of the electronic tax return preparation system/program 110, in other embodiments, such as the one depicted in FIG. 2, the explanation generation system 102 and the electronic tax return preparation system/program 110 can be separate, but operatively coupled systems. In still other systems, the explanation generation system 102 and the electronic tax return preparation system/program 110 may operate on distributed computing and cloud environments.

While FIGS. 1 and 2 depict the server computing device 104 and the user computing device(s) 106, 106', 106" as being operatively coupled by the same network 108, in other embodiments, these computing devices may be operatively coupled by two or more networks.

Figure 3:
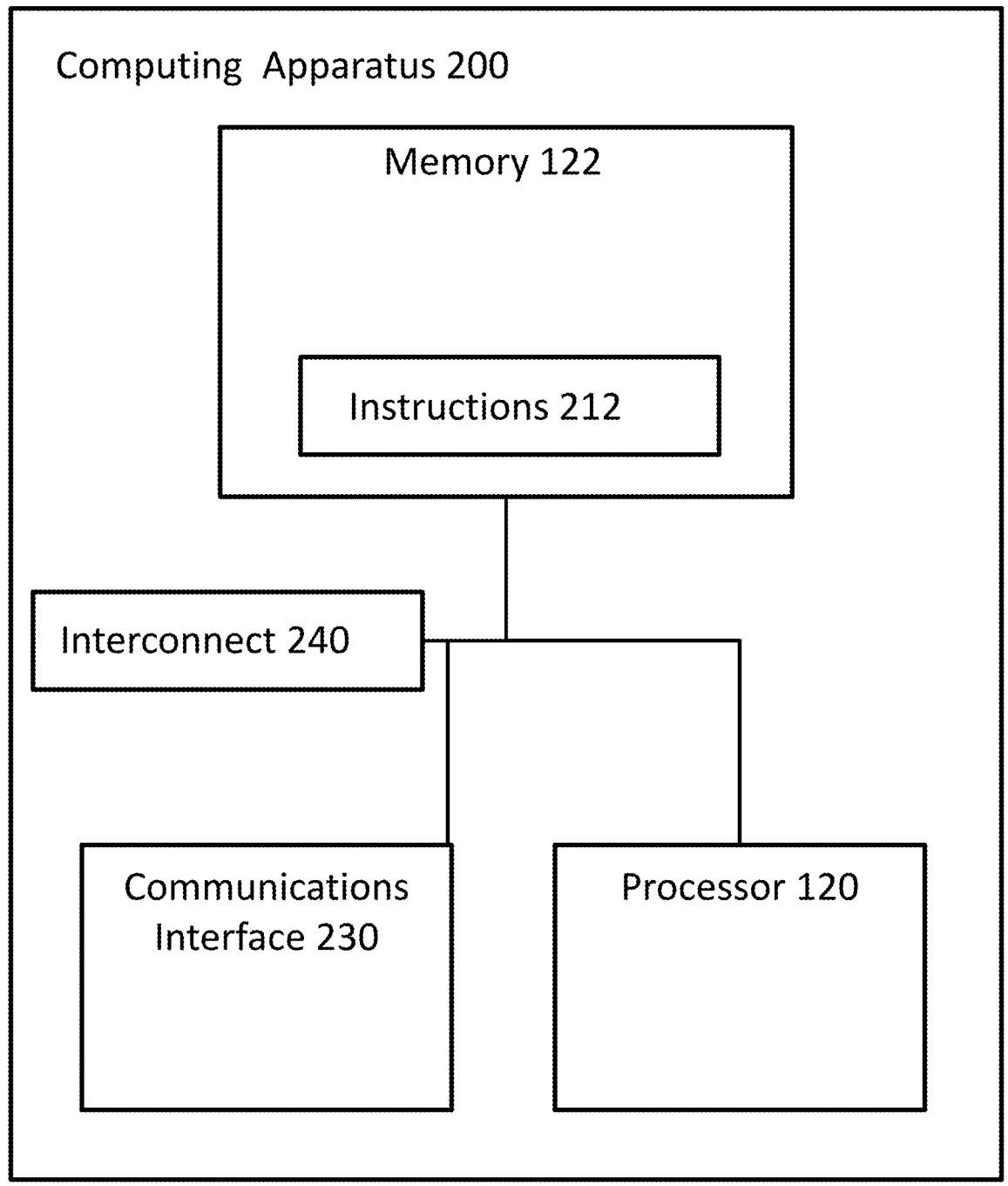
FIG. 3 is a block diagram of a computing apparatus or system in which various embodiments may be implemented or that may be utilized to execute various embodiments.

FIG. 3 generally illustrates certain components of a computing device 200 that may be utilized to execute embodiments and that includes a memory 122, program instructions 212, a processor or controller 124 to execute instructions 212, a network or communications interface 230, e.g., for communications with a network or interconnect 240 between such components. The memory 122 may be or include one or more of cache, RAM, ROM, SRAM, DRAM, RDRAM, EEPROM and other types of volatile or non-volatile memory capable of storing data. The processor unit 124 may be or include multiple processors, a single threaded processor, a multi-threaded processor, a multi-core processor, or other type of processor capable of processing data. Depending on the particular system component (e.g., whether the component is a computing device or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 3 is provided to generally illustrate how embodiments may be configured and implemented. The processors 124', 124" in the server computing device 104 and the user computing device 106 are respectively programmed with the explanation generation system 102 and the browser 112 so that they are no longer generic computing devices.

Figure 4:
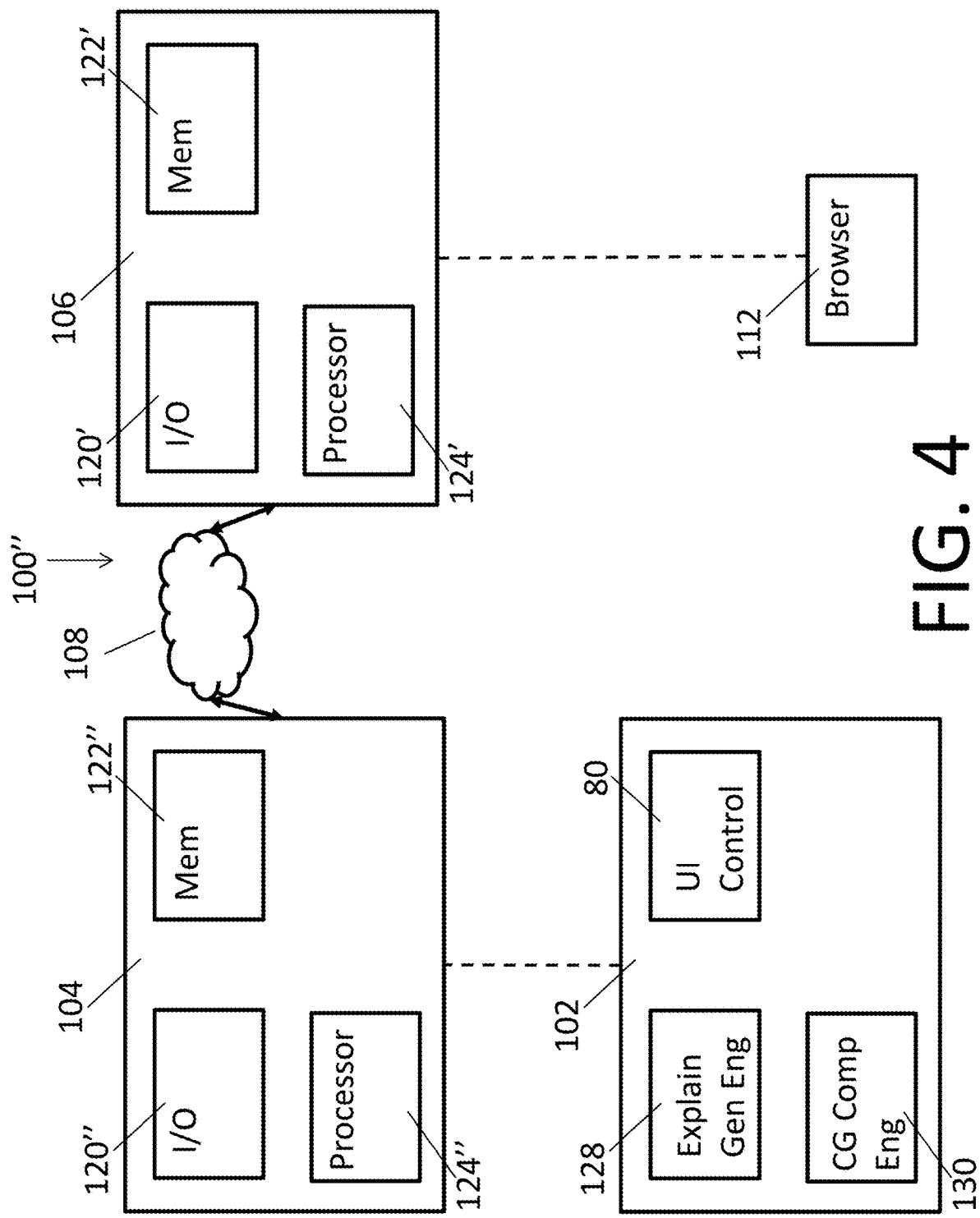
FIG. 4 is a block diagram of a computer system according to one embodiment on which an explanation generation system according to one embodiment may be implemented.

FIG. 4 depicts, in greater detail, another hardware system 100" configured to host an explanation generation system 102 according to one embodiment. Like the hardware system 100 depicted in FIG. 1, the hardware system 100" in FIG. 4 includes a server computing device 104 and a user computing device 106 that are operatively coupled by a network 108. The server computing device 104 includes an input/output module 120', a memory module 122' and a processor 124'. The user computing device 106 includes an input/output module 120", a memory module 122" and a processor 124". The input/output modules 120', 120" are configured to communicate with and facilitate the receipt and transfer of tax data. The memory modules 122', 122" are configured to store tax data, in proper formats for tax data acquisition and explanation generation and presentation. The processors 124', 124" in the server computing device 104 and the user computing device 106 are configured to respectively operate programs (e.g., explanation generation system 102 and browser 112).

The explanation generation system 102 operating on the user computing device 106 includes an explanation generation engine 128 configured to analyze a completeness graph including the variables in same to identify variables/questions that can benefit from explanations (e.g., seemingly misplaced and/or unreasonable variable/questions) and to formulate explanations for these variables/questions. The explanation generation system 102 also includes a completeness graph comparison engine 130 configured to generate snapshots of the empty variables in a completeness graph that needs to be obtained before the completeness graph can be traversed to make a determination regarding the corresponding tax topic. The completeness graph comparison engine 130 is also configured to compare snapshots to identify added empty variables. The completeness graph comparison engine 130 is further configured to identify previously completed completeness graphs/tax topics that have been rendered incomplete by a tax data change. Moreover, the completeness graph comparison engine 130 is configured to analyze completeness graphs to identify added empty variables in the previously completed completeness graphs. The explanation generation system 102 further includes a user interface controller 80 configured to generate a user interface for communication with a user. The browser 112 is configured to transmit information to and receive information from the explanation generation system 102 and to facilitate user interaction with the explanation generation system 102.

Having described various general hardware and software aspects of explanation generation systems according to various embodiments, the explanation generation and presentation software will now be described in greater detail, including data structures therein.

Figure 5:
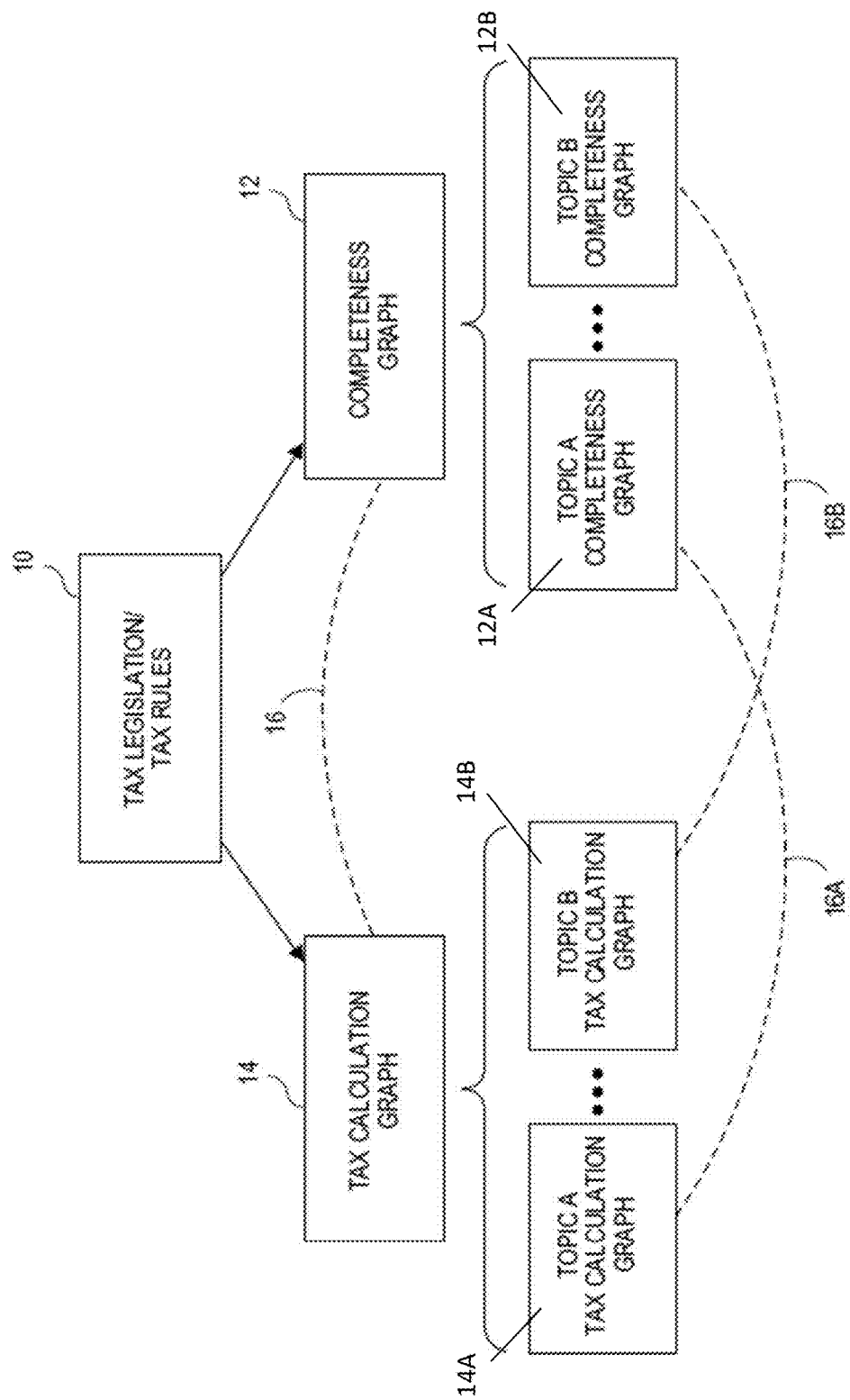
FIG. 5 schematically illustrates that completeness graphs and tax calculation graphs may include information from tax legislation/tax rules.

FIG. 5 illustrates that completeness graphs 12 and tax calculation graphs 14 may include information from tax legislation/tax rules 10. Information from tax legislation or rules 10 may be parsed or broken into various topics (e.g., by linguistic pattern recognition engines or human programmers). For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics (e.g., by linguistic pattern recognition engines or human programmers), each particular topic (e.g., topics A, B) may each have their own dedicated completeness graph 12A, 12B and tax calculation graph 14A, 14B as seen in FIG. 5.

Note that in FIG. 5, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completeness graph 12. Taken collectively, the completeness graph 12 and the tax calculation graph 14 represent data structures that capture all the conditions necessary to complete the computations that are required to complete a tax return that can be filed. The completeness graph 12, for example, determines when all conditions have been satisfied such that a "fileable" tax return can be prepared with the existing data. The completeness graph 12 is used to determine, for example, that no additional data input is needed to prepare and ultimately print or file a tax return. The completeness graph 12 is used to determine when a particular schema contains sufficient information such that a tax return can be prepared and filed. Individual combinations of completeness graphs 12 and tax calculation graphs 14 that relate to one or more topics can be used to complete the computations required for some sub-calculation. In the context of a tax setting, for example, a sub-selection of topical completeness graphs 12 and tax calculation graphs 14 can be used for intermediate tax results such as Adjusted Gross Income (AGI) or Taxable Income (TI), itemized deductions, tax credits, and the like.

Encapsulating the tax code and regulations within calculation graphs 14 results in much improved testability and maintainability of the tax return preparation software 110, by utilizing a modular system architecture. Compared to hard coded complex systems, building a software system from modules (e.g., calculation graphs 14) allows each of these modules to be independently analyzed, tested, maintained, updated, modified and/or changed. Software programming errors ("bugs") can be identified more easily when the calculation graphs 14 are used because such bugs can be traced more easily by analyzing discrete modules in the modular system architecture. In addition, updates to the calculation graphs 14 can be readily performed when tax code or regulations change with less effort by modifying discrete modules in the modular system architecture.

Figure 6:
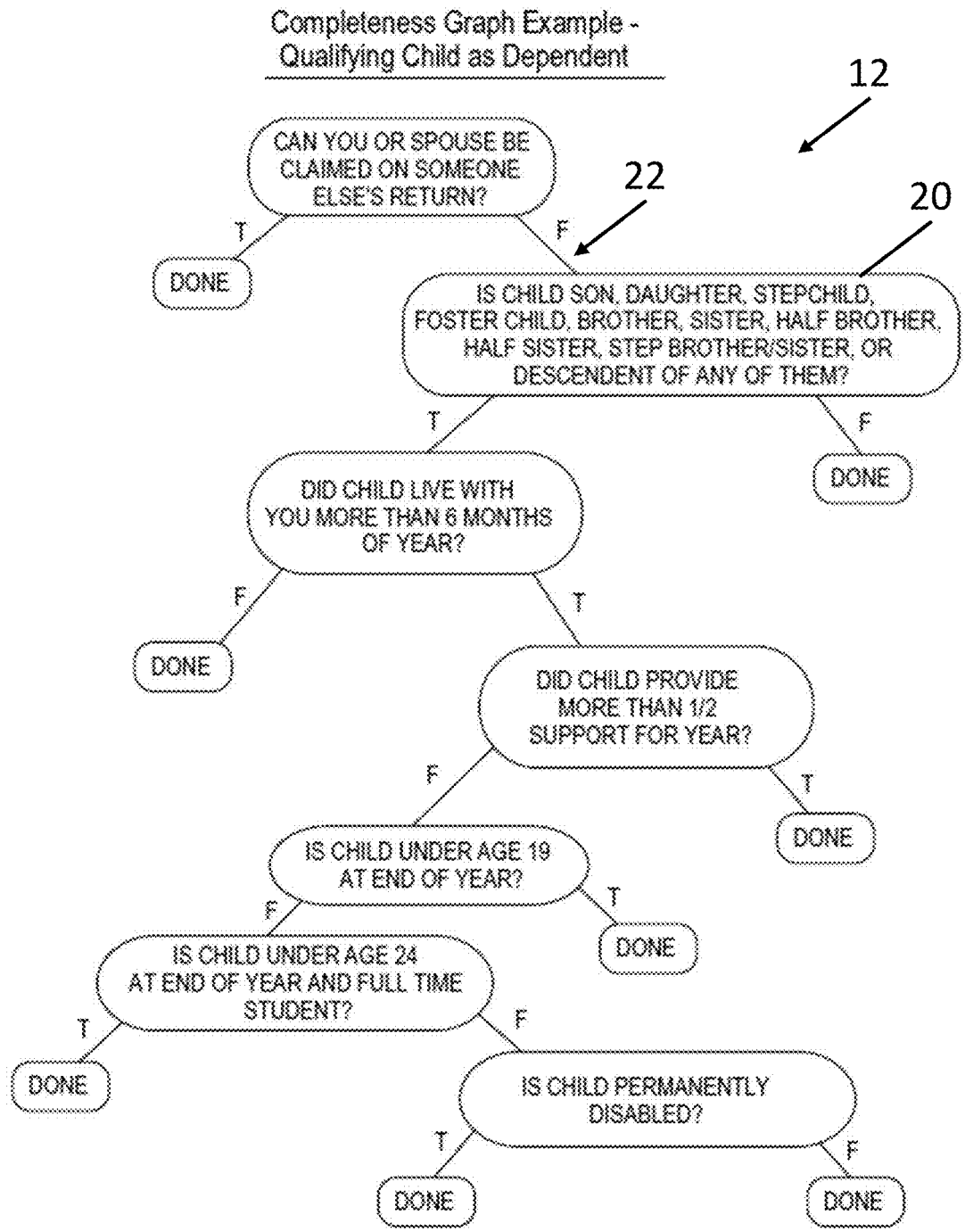
FIGS. 6 and 7 illustrate examples of simplified completeness graphs according to two embodiments.

The completeness graph 12 and the tax calculation graph 14 represent data structures that can be constructed in the form of a logical tree. FIG. 6 illustrates a completeness graph 12 in the form of a logical tree with nodes 20 and arcs 22 representing a basic or general version of a completeness graph 12 for the topic of determining whether a child qualifies as a dependent for federal income tax purposes. A more complete flow chart-based representation of questions related to determining a "qualified child" may be found in U.S. patent application Ser. No. 14/097,057, which is incorporated by reference herein. Each node 20 contains a condition that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 6, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, many branches or lines within the completeness graph 12 can be ignored, for example, when certain questions internal to the completeness graph 12 are answered that eliminate other nodes 20 and arcs 22 within the completeness graph 12. The dependent logic expressed by the completeness graph 12 allows one to minimize subsequent questions based on answers given to prior questions. This allows a minimum question set that can be generated and that can be presented to a user as explained herein.

Figure 7:
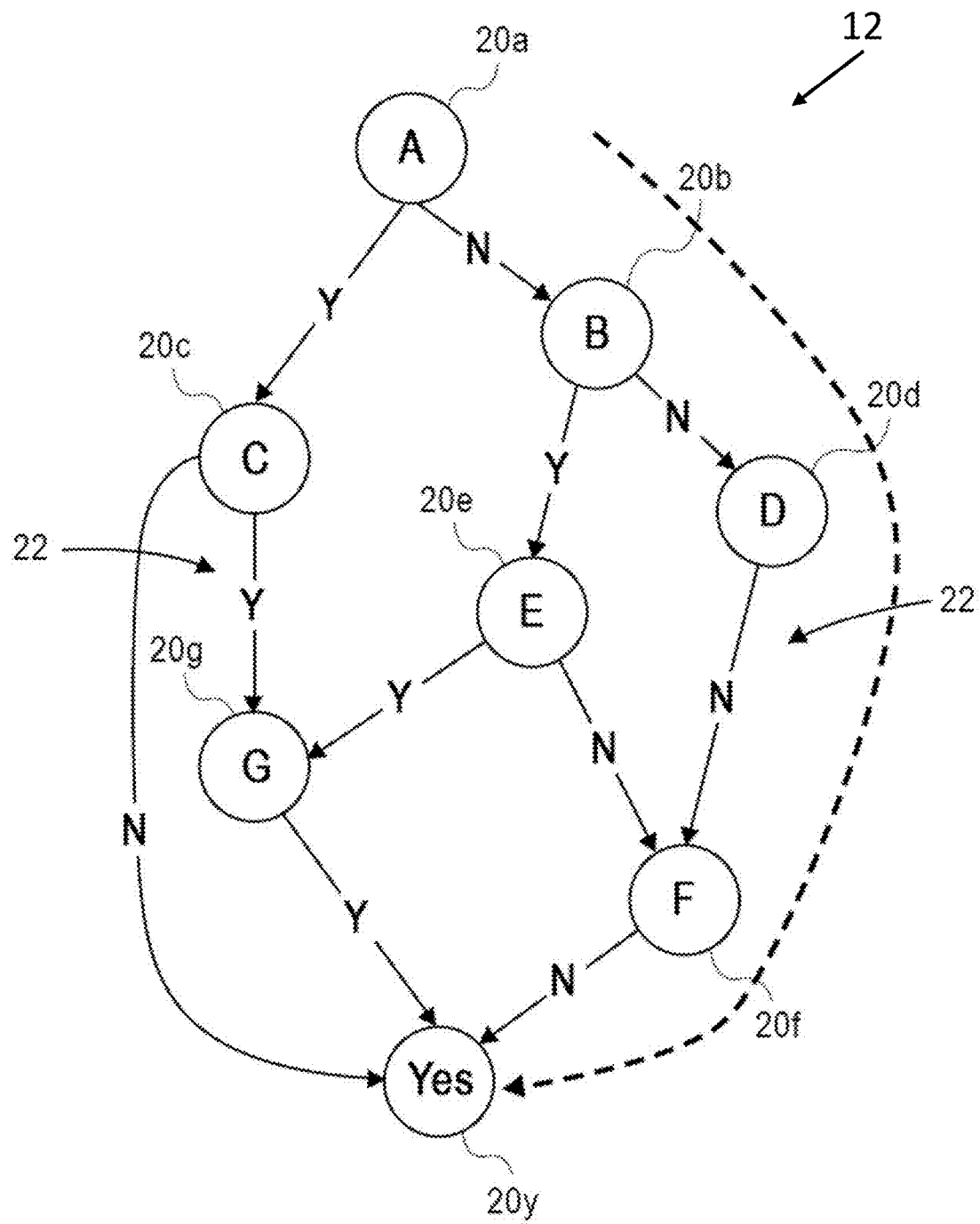

FIG. 7 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completeness graph 12 that is illustrated in FIG. 7 can be traversed through all possible paths from the start node 20a to the termination node 20y. By navigating various paths through the completeness graph 12 in a recursive manner, the system can determine each path from the beginning node 20a to the termination node 20y.

The completeness graph 12 and the nodes 20 and arcs 22 therein can be tagged and later be used or called upon to intelligently explain to the user the reasoning behind why a particular variable is needed (i.e., a node exists) in a particular completeness graph 12, as explained in more detail below.

A completeness graph 12, such as the one depicted in FIG. 7, along with the pathways to completion through the graph can be converted into a different data structure or format. In the illustrated embodiment shown in FIG. 8, this different data structure or format is in the form of a decision table 30. In the illustrated example, the decision table 30 includes rows 32 (five rows 32a-e are illustrated) based on the paths through the completeness graph 12. In the illustrated embodiment, the columns 34a-g of the completeness graph 12 represent expressions for each of the questions (represented as nodes A-G in FIG. 7) and answers derived from completion paths through the completeness graph 12 and column 34h indicates a conclusion, determination, result or goal 34h concerning a tax topic or situation, e.g., "Yes—your child is a qualifying child" or "No—your child is not a qualifying child."

Referring to FIG. 8, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax return preparation software 110. In particular, the decision table 30 is used to select a question or questions to present to a user during an interview process. In this particular example, in the context of the completeness graph 12 from FIG. 7 converted into the decision table 30 of FIG. 8, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that are irrelevant to the particular pathway to completion.

Thus, for example, referring to row 34a, when an answer to $Q_A$ is "Y" and a path is completed through the completeness graph 12 by answering Question C as "N" then answers to the other questions in Nodes B and D-F are "?" since they are not needed to be answered given that particular path.

After an initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_C$ and $Q_G$ in columns 34c, 34g, respectively. One of these questions is selected and the process repeats until either the goal 34h is reached or there is an empty candidate list.

FIG. 9 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data stored by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the user or users preparing the particular tax return. For example, the statistical data 36 may be obtained based on a number of tax filers which is then classified into one or more classifications. For example, statistical data 36 can be organized with respect to age, type of tax filing (e.g., joint, separate, married filing separately), income range (gross, AGI, or TI), deduction type, geographic location, and the like).

FIG. 9 illustrates two such columns 38a, 38b in the decision table 30 that contain statistical data 36 in the form of percentages. For example, column 38a (STAT1) may contain a percentage value that indicates taxpayers under the age of thirty-five where $Rule_1$ is satisfied. Column 38b (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax return preparation software 110 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Figure 10A:
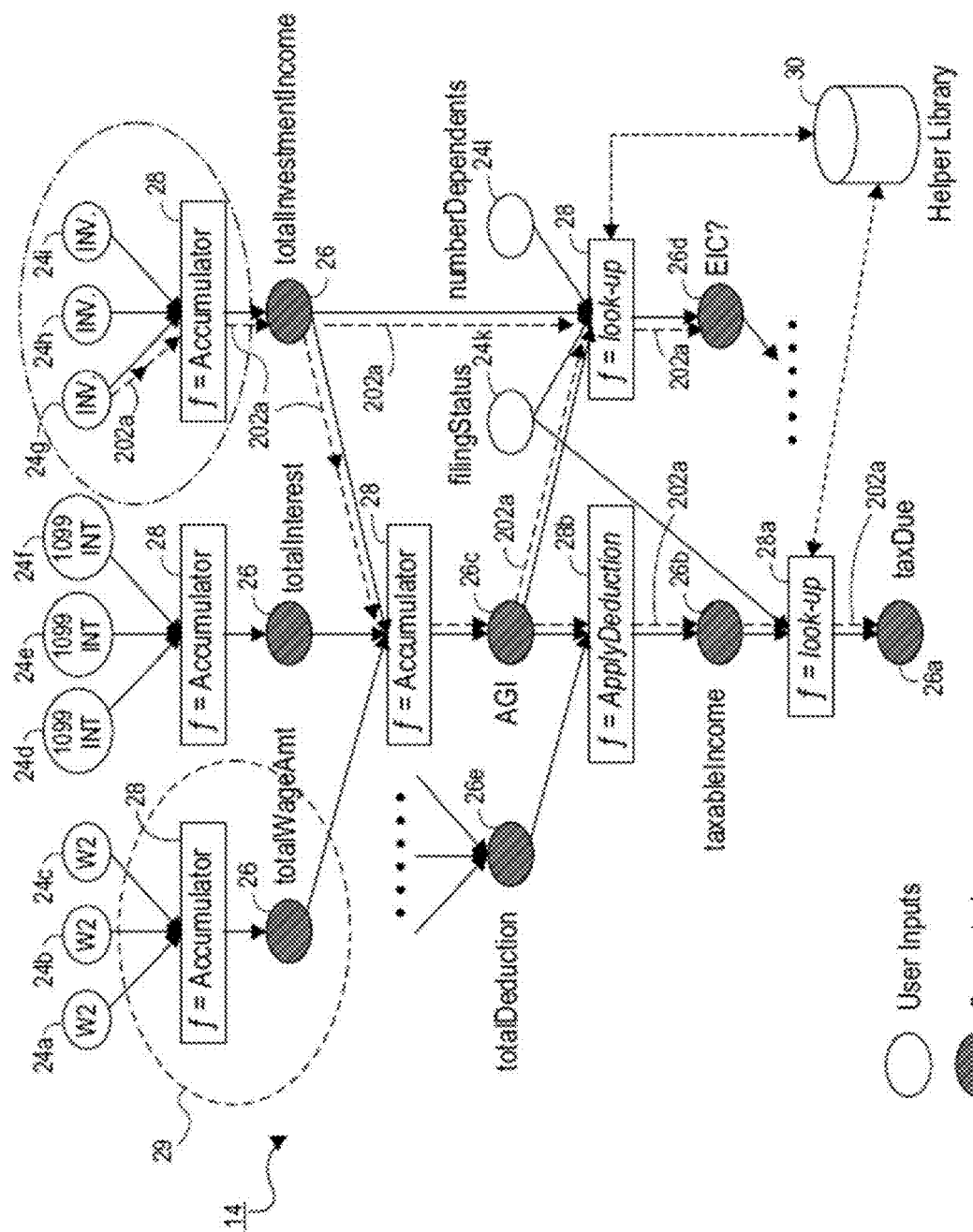
FIGS. 10A and 10B illustrate exemplary calculation graphs according to two embodiments.

FIG. 10A illustrates an example of a tax calculation graph 14. The tax calculation graph 14 semantically describes data dependent tax operations that are used to perform a tax calculation in accordance with the tax code or tax rules 10.

The tax calculation graph 14 in FIG. 10A is a simplified view of data dependent tax operations that are used to determine the taxes Due (taxDue) based on various sources of income, deductions, exemptions, and credits. The tax calculation graph 14 is a type of directed graph (which may be composed of a plurality of directed graphs) and, in most situations relevant to tax calculations, is a directed acyclic graph that encodes the data dependencies amongst tax concepts or topics.

In FIG. 10A, various nodes 24 are leaf or input nodes. Examples of leaf nodes 24 in this particular example include data obtained from W-2 forms, data obtained from 1099-INT forms, data obtained from other investment income (INV), filing status, and number of dependents. Typically, though not exclusively, leaf nodes 24 are populated with user inputs. That is to say the user (e.g. a taxpayer) will enter this information from a user interface as described herein. In other embodiments, however, the leaf nodes 24 may be populated with information that is automatically obtained by the tax return preparation software 110. For example, in some embodiments, tax documents may be imaged or scanned with relevant data being automatically extracted using Object Character Recognition (OCR) techniques. In other embodiments, prior tax returns may be used by the tax return preparation software 110 to extract information (e.g., name, potential dependents, address, and social security number) which can then be used to populate the leaf nodes 24. Online resources such as financial services websites or other user-specific websites can be crawled and scanned to scrape or otherwise download tax related information that can be automatically populated into leaf nodes 24. Additional third party information sources such as credit bureaus, government databases, and the like can also be used by the tax return preparation software 110 to obtain information that can then be populated in to respective leaf nodes 24.

In still other embodiments, values for leaf nodes 24 may be derived or otherwise calculated. For example, while the number of dependents may be manually entered by a taxpayer, those dependents may not all be "qualifying" dependents for tax purposes. In such instances, the actual number of "qualified" dependents may be derived or calculated by the tax return preparation software 110. In still other embodiments, values for leaf nodes 24 may be estimated as described herein.

Still other internal nodes, referred to as functional nodes 26, semantically represent a tax concept and may be calculated or otherwise determined using a function node 28 (also referred to as a "function 28"). The functional node 26 and the associated function 28 define a particular tax operation 29. For example, as seen in FIG. 10A, tax operation 29 refers to total wage income and is the result of the accumulator function 28 summing all W-2 income from leaf nodes 24. The functional node 26 may include a number in some instances. In other instances, the functional node 26 may include a response to a Boolean expression such as "true" or "false." The functional nodes 26 may also be constant values in some instances. Some or all of these functional nodes 26 may be labeled as "tax concepts" or "tax topics." The combination of a functional node 26 and its associated function 28 relate to a specific tax operation 29 as part of the tax topic.

Interconnected functional node 26 containing data dependent tax concepts or topics are associated with a discrete set of functions 28 that are used to capture domain specific patterns and semantic abstractions used in the tax calculation. The discrete set of functions 28 that are associated with any particular functional node may be commonly re-occurring operations for functions that are used throughout the process of calculating tax liability. For instance, examples of such commonly reoccurring functions 28 include copy, capping, thresholding, accumulation or adding, look-up operations, phase out calculations, comparison calculations, exemptions, exclusions, and the like.

In one embodiment, the entire set of functions 28 that is used to compute or calculate a tax liability is stored within a data store 42 which in some instances may be a database 30. The various functions 28 that are used to semantically describe data connections between functional nodes 26 can be called upon by the tax return preparation software 110 for performing tax calculations. Utilizing these common functions 28 greatly improves the efficiency of the tax return preparation software 110 and can be used by a programmer to more easily track and follow the complex nature of the ever-evolving tax code. The common functions 28 also enable easier updating of the tax return preparation software 110 because as tax laws and regulations change, fewer changes need to be made to the software code as compared to prior hard-wired approaches.

In some embodiments, the function node 28 may include any number of mathematical or other operations. Examples of functions 28 include summation, subtraction, multiplication, division, and look-ups of tables or values from a database 30 or library as is illustrated in FIG. 10A. It should be understood that the functional node 26 within completeness graph 12 and the tax calculation graph 14 may be shared in some instances. For example, AGI is a re-occurring tax concept that occurs in many places in the tax code. AGI is used not only for the mathematical computation of taxes but is also used, for example, to determine eligibility of certain tax deductions and credits. Thus, the AGI node is common to both the completeness graph 12 and the tax calculation graph 14.

The tax calculation graph 14 and the associated functional nodes 26 and function nodes 28 can be tagged and later be used or called upon to intelligently explain to the user the reasoning behind why a particular tax result changed or did not change between a first set of tax data and a second set of tax data having one or more different values, as explained in more detail below. The functions 28 can be de-coupled from a specific narrow definition and instead be associated with one or more explanations. Examples of common functions 28 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plans. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

Figure 10B:
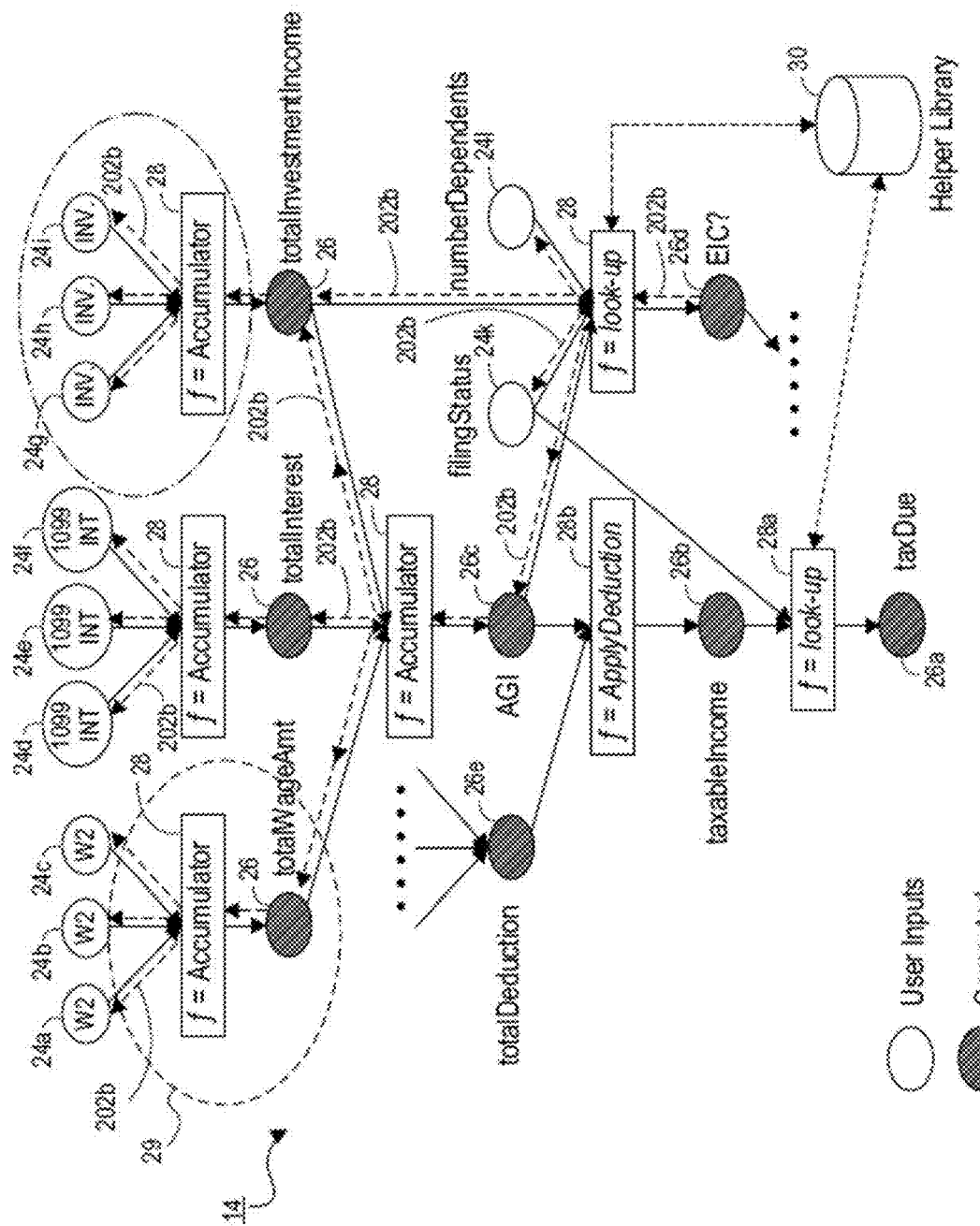

FIG. 10B is the same tax calculation graph as FIG. 10A, except it shows a different impact chain 202, as described in detail below.

Figure 11:
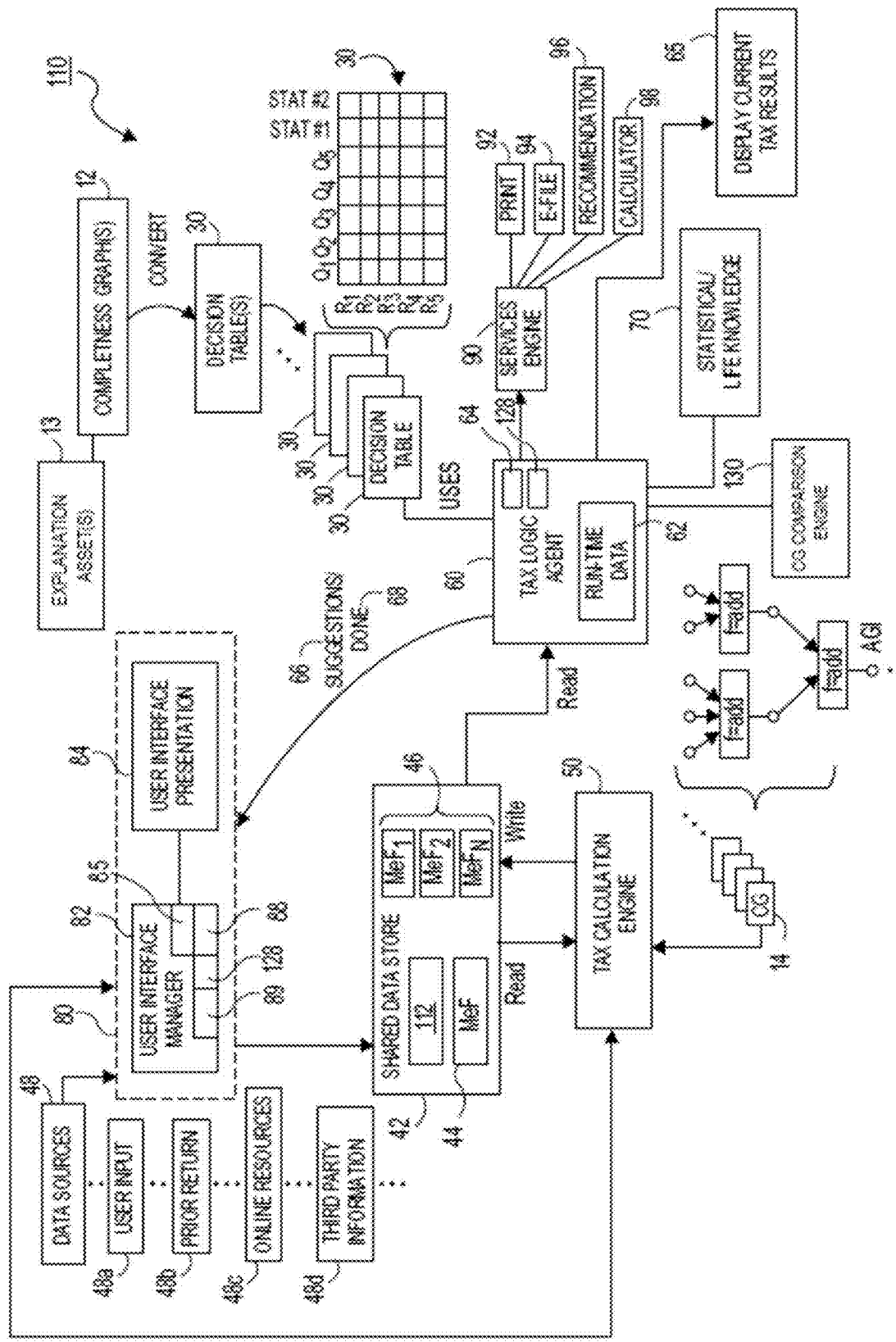
FIG. 11 schematically illustrates a tax preparation system for calculating taxes using rules and calculations based on declarative data structures, and generating and presenting explanations for tax questions, according to one embodiment.

FIG. 11 schematically illustrates a tax return preparation system 110 for calculating taxes using rules and calculations based on declarative data structures according to one embodiment. The system 110 includes a shared data store 42 that contains therein a schema 44 or canonical model representative to the data fields utilized or otherwise required to complete a tax return. The shared data store 42 may be a repository, file, or database that is used to contain the tax-related data fields. The shared data store 42 is accessible by a computing device 104, 106 as described herein (e.g., FIGS. 1 and 2). The shared data store 42 may be located on the computing device 104, 106 running the tax return preparation software 110 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax return preparation software 110 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44. The schema 44 may be a modified version of the MeF schema used by the IRS. For example, the schema 44 may be an extended or expanded version (designated MeF++) of the MeF model established by government authorities that utilizes additional fields. While the particular MeF schema 44 is discussed herein, the invention is not so limited. MeF and MeF+++ are only examples of tax agency standards for electronic filing of tax returns, and the present invention is not limited to any particular standard. Accordingly, any references to MeF or MeF++ in the specification or drawings includes any suitable standard for electronic filing of tax returns.

There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, and a response to a Boolean expression (e.g., True/False or Yes/No). As explained in more detail, the shared data store 42 may, at any one time, have a particular instance 46 of the MeF schema 44 (for MeF++ schema) stored therein at any particular time. For example, FIG. 11 illustrates several instances 46 of the MeF schema 44 (labeled as MeF$_1$, MeF$_2$, MeF$_N$). These instances 46 may be updated as additional data is input into the shared data store 42.

As seen in FIG. 11, the shared data store 42 may import data from one or more computer data sources 48. A number of computer data sources 48 may be used to import or otherwise transfer tax related data to the shared data store 42. This may occur through a user interface controller 80 as described herein or, alternatively, data importation may occur directly to the shared data store 42 (not illustrated in FIG. 11). The tax related data may include personal identification data such as a name, address, or taxpayer ID. Tax data may also relate to, for example, details regarding a taxpayer's employer(s) during a preceding tax year. This may include, employer name, employer federal ID, dates of employment, and the like. Tax related day may include residential history data (e.g., location of residence(s) in tax reporting period (state, county, city, etc.) as well as type of housing (e.g., rental unit or purchased home). Tax related information may also include dependent-related information such as the number of family members in a household including children. Tax related information may pertain to sources of income, including both earned and unearned income as well. Tax related information also include information that pertains to tax deductions or tax credits. Tax related information may also pertain to medical insurance information. For example, under the new Affordable Care Act many taxpayers may obtain health insurance through a state or federal marketplace. Such a marketplace may have information stored or accessible that is used in connection with preparing a tax return. Tax information related to premiums paid, coverage information, subsidy amounts (if any), and enrolled individuals can be automatically imported into the shared data store 42.

For example, user input 48*a* is one type of computer data source 48. User input 48*a* may take a number of different forms. For example, user input 48*a* may be generated by a user using, for example, an input device such as keyboard, mouse, touchscreen display, voice input (e.g., voice to text feature). photograph or image, or the like to enter information manually into the tax return preparation software 110. For example, as illustrated in FIG. 11, user interface manager 82 contains an import module 89 that may be used to select what computer data sources 48 are automatically searched for tax related data. Import module 89 may be used as a permission manager that includes, for example, user account numbers and related passwords. The UI controller 80 enables what sources 48 of data are searched or otherwise analyzed for tax related data. For example, a user may select prior year tax returns 48*b* to be searched but not online resources 48*c*. The tax data may flow through the UI controller 80 directly as illustrated in FIG. 11 or, alternatively, the tax data may be routed directly to the shared data store 42. The import module 89 may also present prompts or questions to the user via a user interface presentation 84 generated by the user interface manager 82. For example, a question may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the computer data sources 48.

User input 48*a* may also include some form of automatic data gathering. For example, a user may scan or take a photographic image of a tax document (e.g., W-2 or 1099) that is then processed by the tax return preparation software 110 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a computer data source 48 is a prior year tax return 48*b*. A prior year tax return 48*b* that is stored electronically can be searched and data is copied and transferred to the shared data store 42. The prior year tax return 48*b* may be in a proprietary format (e.g., .txt, .pdf) or an open source format. The prior year tax return 48*b* may also be in a paper or hardcopy format that can be scanned or imaged whereby data is extracted and transferred to the shared data store 42. In another embodiment, a prior year tax return 48b may be obtained by accessing a government database (e.g., IRS records).

An additional example of a computer data source 48 is an online resource 48c. An online resource 48c may include, for example, websites for the taxpayer(s) that contain tax-related information. For example, financial service providers such as banks, credit unions, brokerages, investment advisors typically provide online access for their customers to view holdings, balances, and transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48c beyond financial service providers. For example, many taxpayers may have social media or similar accounts. These include, by way of illustration and not limitation, Facebook, Linked-In, Twitter, and the like. User's may post or store personal information on these properties that may have tax implications. For example, a user's Linked-In account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?"). Additional follow-up questions can then be presented to the user.

Still referring to FIG. 11, another computer data source 48 includes sources of third party information 48d that may be accessed and retrieved. For example, credit reporting bureaus contain a rich source of data that may implicate one or more tax items. For example, credit reporting bureaus may show that a taxpayer has taken out a student loan or home mortgage loan that may be the source of possible tax deductions for the taxpayer. Other examples of sources of third party information 48d include government databases. For example, the state department of motor vehicles may contain information relevant to tax portion of vehicle registration fees which can be deductible in some instances. Other government databases that may be accessed include the IRS (e.g., IRS tax return transcripts), and state taxing authorities. Third party resources 48d may also include one of the state-based health insurance exchanges or the federal health insurance exchange (e.g., www.healthcare.gov).

Referring briefly to FIGS. 1 and 2, the tax return preparation software 110 (e.g., the system 110 of FIG. 11) is executed by the computing device 104, 106. Referring back to FIG. 11, the tax return preparation software 110 executed by the computing device 104, 106 includes a tax calculation engine 50 that computes one or more tax calculations based on the tax calculation graph(s) 14 and the available data at any given instance within the schema 44 in the shared data store 42. The tax calculation engine 50 may calculate a final tax due amount, a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 5, 10A and 10B. In one embodiment, a series of different calculation graphs 14 are used for respective tax topics. These different calculation graphs 14 may be coupled together or otherwise compiled as a composite calculation graph 14 to obtain an amount of taxes due or a refund amount based on the information contained in the shared data store 42. The tax calculation engine 50 reads the most current or up to date information contained within the shared data store 42 and then performs tax calculations. Updated tax calculation values are then written back to the shared data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation). FIG. 10

Still referring to FIG. 11, the system 110 includes a tax logic agent (TLA) 60. The TLA 60 operates in conjunction with the shared data store 42 whereby updated tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form of a Drools expert engine. Other declarative rules engines 64 may be utilized and a Drools expert rule engine 64 is provided as one example of how embodiments may be implemented. The TLA 60 may be implemented as a dedicated module contained within the tax return preparation software 110.

As seen in FIG. 11, the TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI controller 80. If the rule engine 64 does not output a "done" instruction 68 that means there are one or more topics or sub-topics that are not complete, in which case, as explained in more detail below, the UI controller 80 presents interview questions to a user for answer. The TLA 60 identifies a decision table 30 corresponding to one of the non-complete topics or sub-topics and, using the rule engine 64, identifies one or more non-binding suggestions 66 to present to the UI controller 80. The non-binding suggestions 66 may include a listing or compilation of one or more questions (e.g., $Q_1$-$Q_5$ as seen in FIG. 11) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 9 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI controller 80. As described in U.S. application Ser. No. 14/097,057 previously incorporated herein by reference, data such as required inputs can be stored to a fact cache so that the needed inputs can be recalled at a later time, and to determine what is already known about variables, factors or requirements of various rules:

Rule engine (64)/Tax Logic Agent (TLA) (60)
　// initialization process
　Load_Tax_Knowledge_Base;
　Create_Fact_Cache; While (new_data_from_application)
　Insert_data_into_fact_cache;
　collection=Execute_Tax_Rules; // collection is all the fired rules and corresponding conditions
　suggestions=Generate_suggestions (collection);
　send_to_application(suggestions);

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. More specifically, the statistical/life knowledge module may comprise tax correlation data regarding a plurality of tax matter correlations. Each of the tax matter correlations quantifies a correlation between a taxpayer attribute and a tax related aspect. For instance, a taxpayer attribute could be taxpayer age which may be correlated to a tax related aspect such as having dependents, or a taxpayer attribute might be taxpayer age which may be correlated to homeownership or other relevant tax related aspect. The tax correlation data also quantifies the correlations, such as by a probability of the correlation. For instance, the correlation between the taxpayer attribute and the tax related aspect may be a certain percentage probability, such as 10%, 20%, 30%, 40%, 50%, 60%, or any percentage from 0% to 100%. Alternatively, the quantification can be a binary value, such as relevant or not relevant. In other words, for a given taxpayer attribute, it may be determined that a tax related aspect is relevant or completely not relevant when a taxpayer has the given taxpayer attribute. As an example, if the taxpayer attribute is that the taxpayer is married, the correlation may indicate that spouse information is relevant and will be required.

The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(b) retirement accounts. This information may then be used by the TLA 60 when generating its suggestions 66. For example, rather than asking generically about retirement accounts, the suggestion 66 can be tailored directly to a question about 403(b) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular tax payer but is rather generalized to characteristics shared across a number of tax payers although in other embodiments, the data may be more specific to an individual taxpayer.

As shown in FIG. 11, the TLA 60 may also include an explanation generation system 102. The explanation generation system 102 analyzes one or more completeness graphs 12 to generate an explanation asset 13 for a tax question (i.e., a variable or a node 20 in a completeness graph 12). The explanation generation system 102 indexes the explanation asset 13 to the tax question and the completeness graphs 12. For instance, the explanation asset 13 may be indexed to the completeness graph node 20 corresponding to the tax question in a completeness graph 12, as shown in FIG. 11. The explanation generation system 102 also presents the explanation asset 13 when the tax question is presented to a user. "Presenting" the explanation asset 13 may include displaying the explanation asset 13 indexed to the tax question and the completeness graph corresponding to the user's location in the electron tax return preparation user experience. "Presenting" the explanation asset 13 may also include displaying a plurality of explanation assets 13 indexed to the tax question and a plurality of completeness graphs. The plurality of completeness graphs may be all of the completeness graphs including the tax question, or fewer than all of those completeness graphs (e.g., all of the incomplete completeness graphs). "Presenting" the explanation asset 13 may further include displaying a user interface object to the user that is selectable to display the one or more explanation asset(s) 13.

The explanation generation system 102 also generates snapshots of the empty variables/nodes 20 in a completeness graph 12 that needs to be obtained before the completeness graph 12 can be traversed to make a determination regarding the corresponding tax topic. The explanation generation system 102 further compares snapshots to identify added empty variables/nodes 20. Moreover, the explanation generation system 102 identifies previously completed completeness graphs 12/tax topics that have been rendered incomplete by a tax data change. In addition, the explanation generation system 102 analyzes completeness graphs 12 to identify added empty variables/nodes 20 in the previously completed completeness graphs 12.

The explanation generation system 102 includes an explanation generation engine 128 configured to analyze a completeness graph including the variables in same to identify variables/questions that can benefit from explanations (e.g., seemingly misplaced and/or unreasonable variables/questions) and to formulate explanations for these variables/questions. The explanation generation system 102 also includes a completeness graph comparison engine 130 configured to (1) generate snapshots of the empty variables/nodes 20 in a completeness graph 12 that needs to be obtained before the completeness graph 12 can be traversed to make a determination regarding the corresponding tax topic, (2) compare snapshots to identify added empty variables/nodes 20, (3) identify previously completed completeness graphs 12/tax topics that have been rendered incomplete by a tax data change, and (4) analyze completeness graphs 12 to identify added empty variables/nodes 20 in the previously completed completeness graphs 12. The explanation generation system 102 further includes a user interface controller 80 configured to generate a user interface for communication with a user.

Still referring to FIG. 11, the UI controller 80 encompasses a user interface manager 82 and a user interface presentation or user interface 84. The user interface presentation 84 is controlled by the user interface manager 82 and may manifest itself, typically, on a visual screen or display 114 that is presented on a computing device 102 (seen, for example, in FIGS. 16-19). The computing device 102 may include the display of a computer, laptop, tablet, mobile phone (e.g., smartphone), or the like. Different user interface presentations 84 may be invoked using a UI generator 85 depending, for example, on the type of display or screen 114 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions and/or respective single explanation asset 13 or multiple explanation assets 13 that are suggested to be displayed to the taxpayer via the user interface presentation 84. The user interface manager 82, in one aspect of the invention, contains a suggestion resolution element 88, which is responsible for resolving how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may comprise pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on the fly during runtime.

As seen in FIG. 11, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the tax return preparation software 110 using an input device that is associated with the computing device. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be requested from the taxpayer. For example, with regard to donated goods, the taxpayer may be prompted to explain what the donated goods are and describe the same in sufficient detail to satisfy requirements set by a particular taxing authority.

Still referring to FIG. 11, in one aspect, the TLA 60 outputs a current tax result 65 which can be reflected on a display 114 of a computing device 104, 106. For example, the current tax result 65 may illustrate a tax due amount or a refund amount. The current tax results 65 may also illustrate various other intermediate calculations or operations used to calculate tax liability. For example, AGI or TI may be illustrated. Deductions (either itemized or standard) may be listed along with personal exemptions. Penalty or tax credits may also be displayed on the computing device 104, 106. This information may be displayed contemporaneously with other information, such as user input information, or user interview questions or prompts or even narrative explanations 116 as explained herein.

The TLA 60 also outputs a tax data that is used to generate the actual tax return (either electronic return or paper return). The return itself can be prepared by the TLA 60 or at the direction of the TLA 60 using, for example, the services engine 90 that is configured to perform a number of tasks or services for the taxpayer. The services engine 90 is operatively coupled to the TLA 60 and is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). Whether a paper or electronic return is filed, data from the shared data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare analyze differences between tax years.

By using calculation graphs 14 to drive tax calculations and tax operations, it is possible to determine interdependencies of the nodes (including tax operations, functional nodes and function nodes) and the year-over-year calculation graphs 14 can be used to readily identify differences and report the same to a user. Differences can be found using commonly used graph isomorphism algorithms over the two respective calculation graphs 14.

In operation of the system 110 to prepare a tax return, a user initiates the tax return preparation software 110 on a computing device 104, 106 as seen, for example, in FIGS. 1 and 2. The tax return preparation software 110 may reside on the user computing device 106 that the user interfaces with or, alternatively, the tax return preparation software 110 may reside on a remote computing device 104 such as a server or the like as illustrated. In such instances, the user computing device 106 that is utilized by the user or tax payer may communicate with the remote server computing device 104 using an application running on the user computing device 106. The tax return preparation software 110 may also be run using Internet browser software 112 running on the user computing device 106. Communication between the user computing device 106 and the remote server computing device 106 may occur over a wide area network such as the Internet. Communication may also occur over a private communication network (e.g., mobile phone network).

A user initiating the tax return preparation software 110, as explained herein may import tax related information from one or more computer data sources 48. Tax data may also be input manually with user input 48a. The tax calculation engine 50 computes one or more tax calculations dynamically based on the then available data at any given instance within the schema 44 in the shared data store 42. In some instances, estimates or educated guesses may be made for missing data. Details regarding how such estimates or educated guesses are done maybe found in U.S. patent application Ser. No. 14/448,986 which is incorporated by reference as if set forth fully herein.

In one embodiment, the explanation generation engine 128 may analyze the completeness graphs 12 for the tax topics addressed by tax return preparation software 110, and generate explanation assets 13 for some variables (e.g., nodes 20) in the completeness graphs 12. The explanation generation engine 128 may also index the explanation assets 13 to respective variables (e.g., nodes 20) in respective completeness graphs 12.

In another embodiment, as the tax return preparation software 110 is collecting tax data from the user, the tax return preparation software 110 may need to collect tax data corresponding to a variable (e.g., node 20) in a completeness graph 12, where the variable (e.g., node 20) has an explanation asset 13 indexed thereto. When the tax return preparation software 110 collects tax data corresponding to such a variable (e.g., node 20) in a completeness graph 12, the tax return preparation software 110 may present the explanation asset and/or user interface object selectable to display respective explanation asset along with a tax questions corresponding to the variable/node 20 to the user.

In still another embodiment, when the user changes tax data, the tax return preparation software 110 may execute a completeness graph comparison engine 130, as described above. In one embodiment, the completeness graph comparison engine 130 then generates a second snapshot of the variables/nodes 20 needed to complete a completeness graph 12 for a tax topic. The completeness graph comparison engine 130 then compares the second snapshot with the first snapshot previously generated (e.g., by the completeness graph comparison engine 130) when the user last left data collection for that tax topic to identify added variables/nodes 20 in the second snapshot that are missing from the first snapshot. Then the rule engine 64 in the TLA 60 may utilize a fact cache to generate non-binding suggestions 66 for additional questions corresponding to the added variables/nodes 20 and the explanation assets 13 indexed to the added variables/nodes 20, if any. These non-binding suggestions 66 may be communicated to the UI controller 80, which may cause one or more additional questions along with corresponding explanation assets 13 to be presented to the user.

In still another embodiment, when the user changes any tax data, all of the completeness graphs 12 of the tax return preparation software 110 are run to identify previously completed completeness graphs 12/tax topics that have been rendered incomplete by the tax data change. The system 110 then executes a completeness graph comparison engine 130, which analyzes the completeness graphs 12 to identify added empty variables/nodes 20 in the previously completed completeness graphs 12 (corresponding to tax topics). The system 110 then executes an explanation generation engine 128, which generates an explanation asset 13 for the additional questions corresponding to the added empty variables/nodes 20. This explanation asset 13 may result in a non-binding suggestions 66 communicated to the UI controller 80. The system 110 may then display the explanation asset 13 to the user.

In yet another embodiment, when the completeness graph comparison engine 130 determines there is no difference between the first and second snapshots and/or no added empty variables/nodes 20, the completeness graph comparison engine 130 generates, or directs the explanation generation engine 128 to generate, an explanation asset 13 for the lack of added questions notwithstanding the tax data change. This explanation asset 13 may result in a non-binding suggestions 66 communicated to the UI controller 80. The system 110 may then display the explanation asset 13 to the user.

In existing systems, a user walks through a set of defined user interface interview screens that selectively ask questions that are relevant to a particular user/taxpayer and a particular tax topic. These questions are typically presented without explanation, which may lead to fear, uncertainty and doubt (e.g., when seemingly misplaced and/or unreasonable questions for a particular user and a particular tax topic) are asked. In other embodiments, questions may be presented with lengthy boilerplate explanations that (1) unnecessarily lengthen the data entry process and (2) make it difficult to identify the explanation specific to the particular user's situation.

In existing systems, when a user changes tax data, the system provides no explanations for any questions added as a result of the tax data change. In other embodiments, questions may be presented with the same lengthy boilerplate explanations described above.

In contrast to the defined user interface screens with either no explanations or ineffective explanations presented either in pre-defined order or in response to changes in tax data by prior iterations of tax return preparation software, the embodiments described herein provide an explanation generation system 102 that may run on a computing device 104 (as seen in FIGS. 1 and 2) that operates on a new construct in which tax rules and the tax determinations based thereon are established in declarative data-structures, namely, one or more completeness/completion graphs 12 (see FIGS. 6 and 7). Completeness graphs 12 are data structures in the form of graphs having interconnecting nodes 20 in which arcs 22 are directed from one node to another (e.g., 22a from 20a to 20b). Completeness graphs 12 identify when all conditions have been satisfied to complete a tax topic determination (i.e., whether an individual qualifies for a particular deduction). Use of these data-structures permits the user experience to be loosely connected or even divorced from the tax calculation engine and the tax data used in the tax topic determinations. Tax topic results are dynamically determined based on tax data derived from sourced data, estimates, user input, etc.

While FIG. 11 depicts the explanation generation engine 128 as forming respective parts of both the TLA 60 and the UI controller 80, the explanation generation engine 128 can form a part of only one of the TLA 60 and the UI controller 80. Alternatively the explanation generation engine 128 can exist apart from the TLA 60 and the UI controller 80, while remaining logically coupled thereto. While FIG. 11 depicts the completeness graph comparison engine 130 as logically coupled to the TLA 60, the completeness graph comparison engine 130 may be logically coupled to any other part of the electronic tax return preparation system 110.

Figure 12:
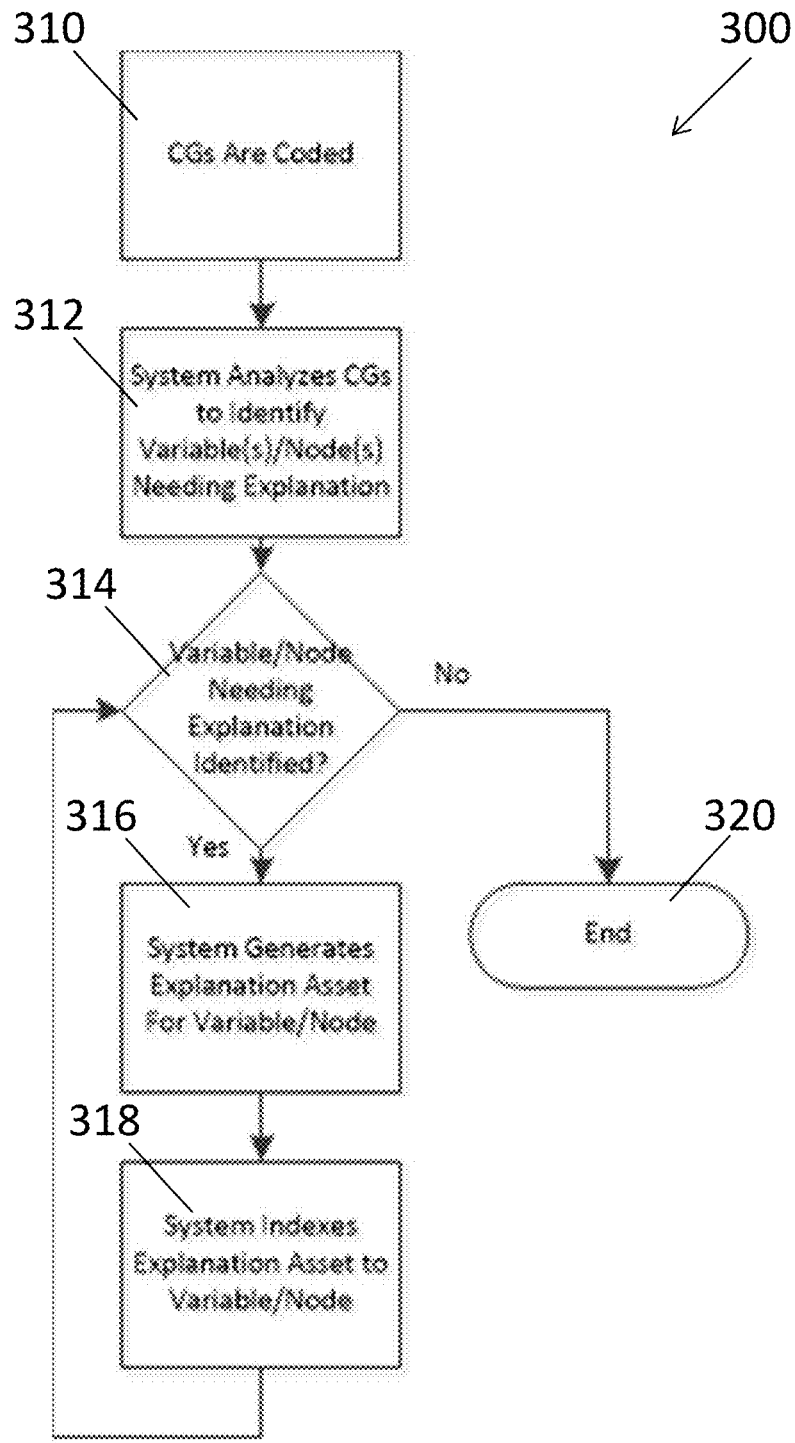
FIG. 12 is a flow chart depicting a computer-implemented method/algorithm for generating explanation assets and indexing the explanation assets to corresponding variables/nodes in completeness graphs according to one embodiment.

FIG. 12 depicts a method 300 of generating explanation assets 13 and indexing the explanation assets 13 to corresponding variables/nodes 20 in completeness graphs 12. By generating and indexing explanation assets 13 to variables/nodes 20 completeness graphs 12, this method 300 allows explanation generation systems 102 to provide appropriate explanations for tax questions that may benefit from explanations (e.g., tax questions that seem misplaced and/or unreasonable in view of the tax topic context of the tax question).

At step 310, the completeness graphs 12 for an electronic tax return preparation system 110 are coded. The completeness graphs 12 may be coded by the electronic tax return preparation system 110, either automatically or semi-automatically with programmer input.

At steps 312, the explanation generation system 102 (e.g., the explanation generation engine 128) analyzes the completeness graphs 12 to identify one or more variables/nodes 20 corresponding to questions that can benefit from explanations (e.g., seemingly misplaced and/or unreasonable questions in view of the tax topic corresponding to the completeness graphs 12 in which the respective variables/nodes 20 are found). The explanation generation engine 128 can identify such variables/nodes 20 either using a template or semi-automatically with programmer input. For example, a node 20 in a completeness graph 12 for determining the tax implications of the Affordable Care Act is the taxpayer's ZIP code, as explained above. When the explanation generation engine 128 traverses the completeness graph for the Affordable Care Act, the explanation generation engine 128 may identify the node 20 corresponding to the taxpayer's ZIP code as a node 20 that requires an explanation. Identifying a node 20 may include flipping a bit associated with the node 20 to differentiate the identified node 20 from other nodes 20.

At step 314, the explanation generation engine 128 determines whether any node 20 can benefit from an explanation (e.g., any node 20 that is seemingly misplaced and/or unreasonable questions in view of the tax topic corresponding to the completeness graph 12) has been identified. If such a node 20 has been identified, the explanation generation engine 128 proceeds to step 316. If such a node 20 has not been identified in the entire completeness graph 12, the explanation generation engine 128 proceeds to step 320, where the method 300 ends.

At step 316, the explanation generation engine 128 generates an explanation asset 13 for a variable/node 20 in a completeness graph 12. The explanation generation engine 128 can generate the explanation assets 13 automatically (e.g., using a template and/or a natural language engine) or semi-automatically with programmer input (hardcoded). The explanation generation engine 128 can analyze the variable/node 20 and the completeness graph 12, including the target (e.g., tax topic) corresponding to the completeness graph 12 and the portion of the completeness graph 12 (e.g., other nodes 20 and arcs 22) adjacent the variable/node 20 to identify terms to be used to generate/build an explanation asset 13. In one embodiment, these terms can be used to complete a hardcoded template to generate an explanation asset 13. In another embodiment, a natural language engine can operate on the terms to generate a more readily understood explanation asset 13.

For example, the explanation asset 13 may be "Your ZIP code is needed to benchmark the health care cost in your area." When generating this explanation asset 13, the explanation generation engine 128 accesses both the node 20 (ZIP code) and the tax topic associated with the completeness graph 12 (the Affordable Care Act). In a more personalized embodiment, the explanation asset may use an explanation template. In such embodiments, the explanation asset may be "Because you live in California, we need your ZIP code to set a benchmark for Affordable Care Act." The proper noun "California" may be a field in the explanation template fillable with information from the personal information section. The explanation generation engine 128 may include a natural language engine (not shown) to improve the user experience by generating natural language explanations.

At step 318, the explanation generation engine 128 indexes the explanation asset 13 generated at step 316 to the corresponding node 20 and completeness graphs 12 for which the explanation asset 13 was generated. Indexing the explanation asset 13 to the node 20 may include logically associating the explanation asset 13 to the node 20 such that the explanation asset 13 can be identified using the identity of the node 20 in the completeness graph 12, and vice versa. For instance, the explanation asset 13 may be metadata attached to a node 20 in a completeness graph 12.

After the explanation asset 13 and the node 20 are indexed, the explanation generation engine 128 returns to step 314 where the explanation generation engine 128 determines whether any node 20 can benefit from an explanation (e.g., any node 20 that is seemingly misplaced and/or unreasonable in view of the tax topic corresponding to the completeness graph 12) remains. If such a node 20 remains, the explanation generation engine 128 proceeds to steps 316 and 318 for explanation generation and indexing as described above. If no such node 20 remains in the entire completeness graph 12, the explanation generation engine 128 proceeds to step 320, where the method 300 ends.

Generating explanation assets 13 and indexing those assets 13 to the corresponding nodes 20 in the corresponding completeness graphs 12 preparers an electronic tax return preparation system 110 to present questions to a user/taxpayer along with explanations for questions that can benefit from an explanation (e.g., may seem misplaced and/or unreasonable relative to the tax topic represented by the completeness graphs 12 in which the questions/nodes 20 appear.

Figure 13:
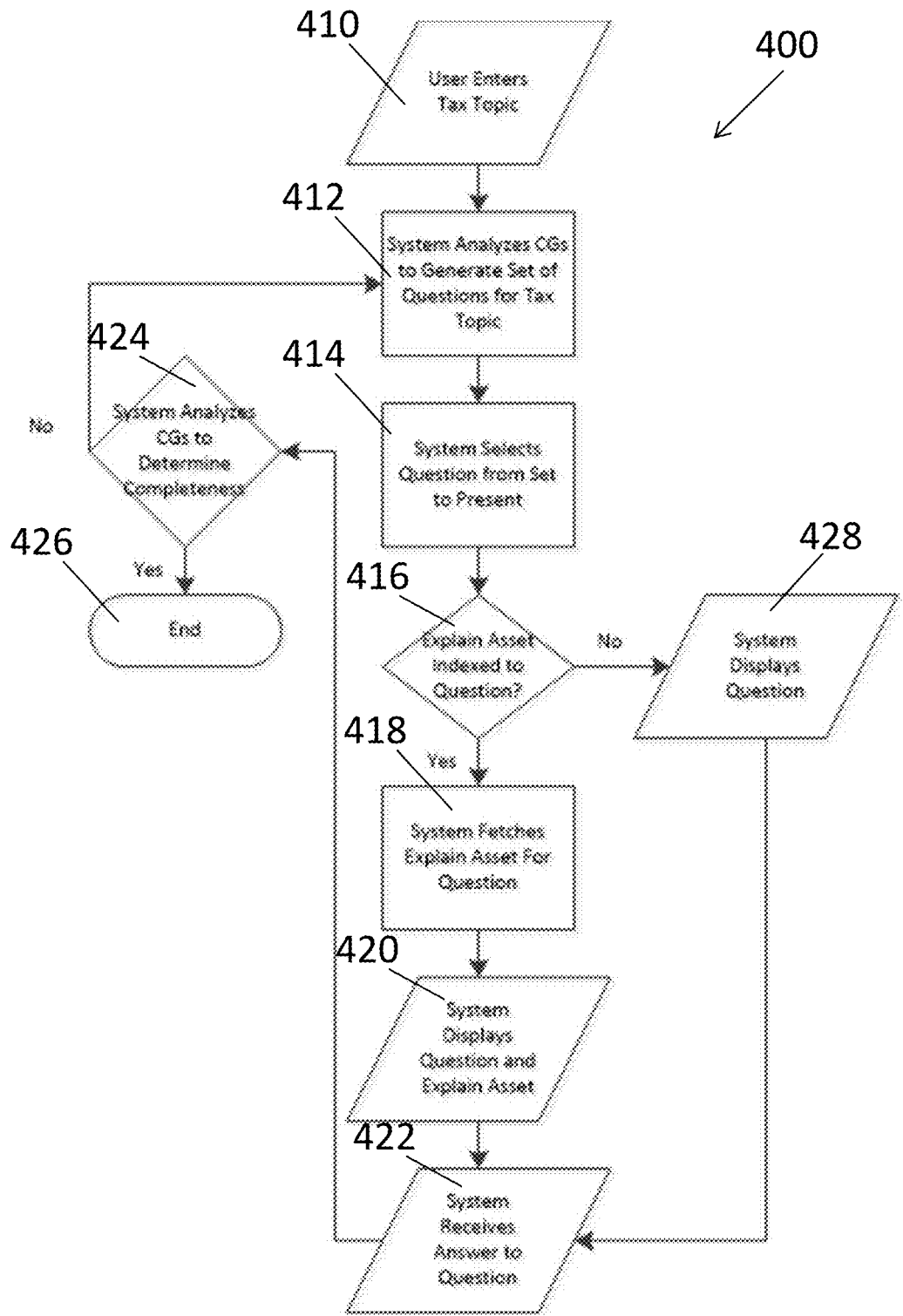
FIG. 13 is a flowchart depicting a computer-implemented method/algorithm for presenting and displaying questions, with or without explanations, to users during collection of tax data for preparation of electronic tax returns according to one embodiment.

FIG. 13 depicts a method 400 of presenting/displaying questions, with or without explanations, to users during collection of tax data for preparation of electronic tax returns. By presenting questions with explanations where appropriate (e.g., where a question is seemingly misplaced and/or unreasonable in view of the current tax topic), the method 400 reduces user fear, uncertainty and doubt, thereby improving user interaction with electronic tax return preparation systems 110.

At step 410, the user/taxpayer enters a tax topic for collection of tax data during preparation of an electronic tax return. The user may enter the tax topic by selecting any number of user interface items in a predetermined series of user interfaces of an electronic tax return preparation system.

At step 412, the electronic tax return preparation system 110 analyzes the completeness graphs 12 corresponding to the tax topic and the tax data corresponding to the taxpayer available to the system 110 to generate a set of questions for the user. The set of questions may be generated by analyzing the completeness graphs 12 that have been transformed into decision tables 30 as illustrated in FIGS. 8 and 9. The set of questions represents nodes 20 that are currently empty and require information so that respective completeness graphs 12 can be traversed to make a determination regarding the corresponding tax topics.

At step 414, electronic tax return preparation system 110 selects a question from the set of questions generated at step 412 to present to the user. The questions may be selected based on a predetermined order or some other algorithm for minimizing the number of questions presented to the user.

At step 416, the electronic tax return preparation system 110 determines whether an explanation asset 13 is indexed to the question selected at step 414. For instance, an explanation asset 13 may have been indexed to the question corresponding to a node 20 in a completeness graph 12 as described with respect to FIG. 8. Accordingly, the node 20 corresponding to the question may be associated with a flipped bit to indicate that the node 20 is indexed to an explanation asset 13. When the electronic tax return preparation system 110 determines that an explanation asset 13 is indexed to the selected question, the system 110 proceeds to step 418. When the electronic tax return preparation system 110 determines that no explanation asset 13 is indexed to the selected question, the system 110 proceeds to step 428.

At step 418, electronic tax return preparation system 110 fetches the explanation asset 13 corresponding to the question (i.e., the node 20 in the completeness graph 12). This data call process is facilitated by the indexing of the explanation asset 13 to the node 20.

At step 420, the electronic tax return preparation system 110 displays or causes the display of the question and the explanation asset 13 indexed thereto to the user. As discussed above, the system 110 (e.g., the TLA 60) may generate one or more non-binding suggestions 66, which are communicated to the UI controller 80. The UI controller 80 and instructs the visual display 114 of the user computer 106 to display the question and the explanation asset 13. Displaying an explanation asset 13 may include an intermediate step during which a user interface object that is selectable to cause display of the explanation asset 13 is displayed to the user.

Figure 16:
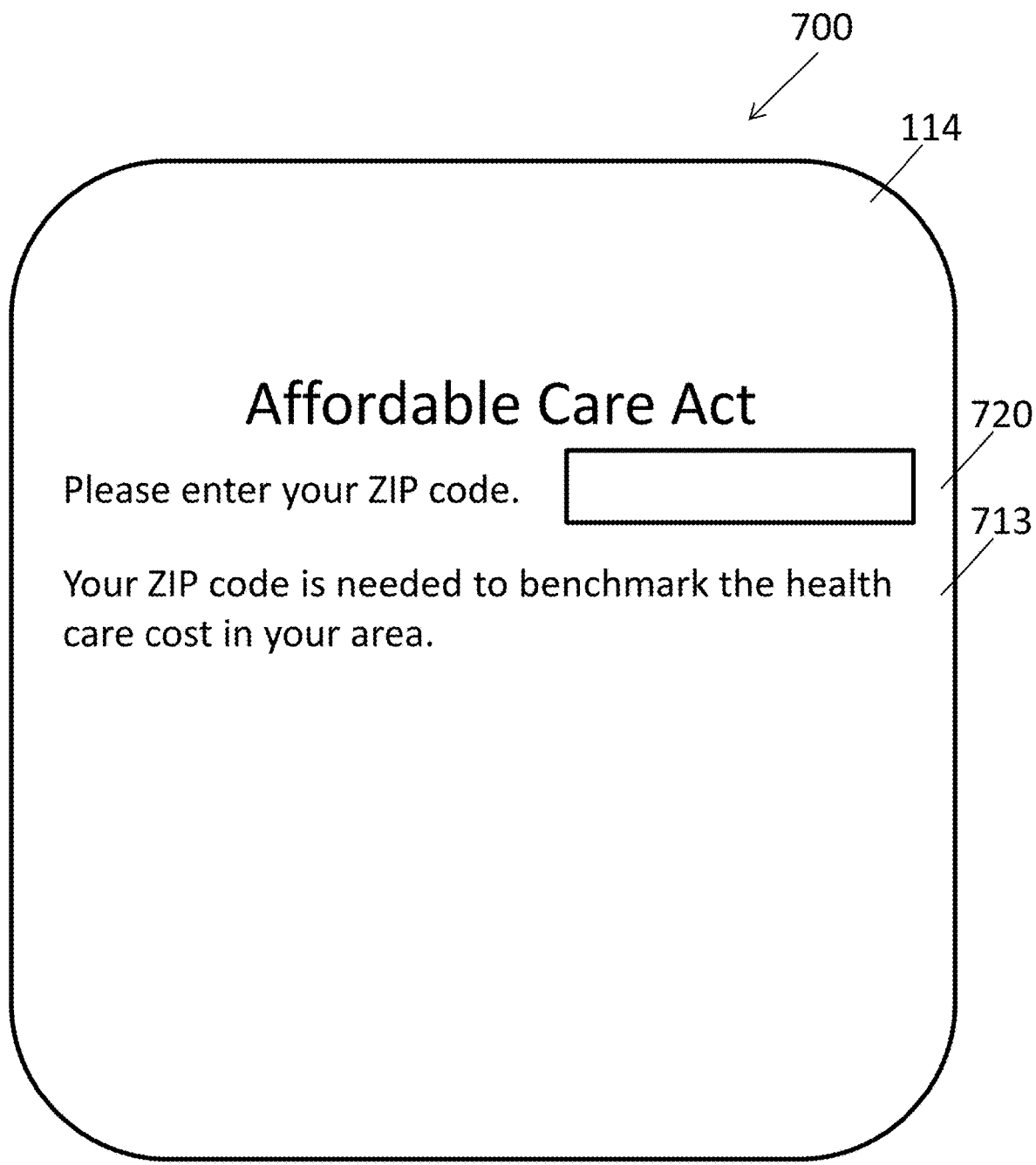
FIGS. 16 to 18 are exemplary user interfaces on user computers for displaying explanations for tax questions according to various embodiments.

An exemplary explanation asset 713 and its corresponding questions/node 720 is shown in FIG. 16, which illustrates a user interface 700 of an electronic tax return preparation system 110. The user interface 700 is presented by a visual display/screen 114 (e.g., of a user computer 106).

Figure 17:
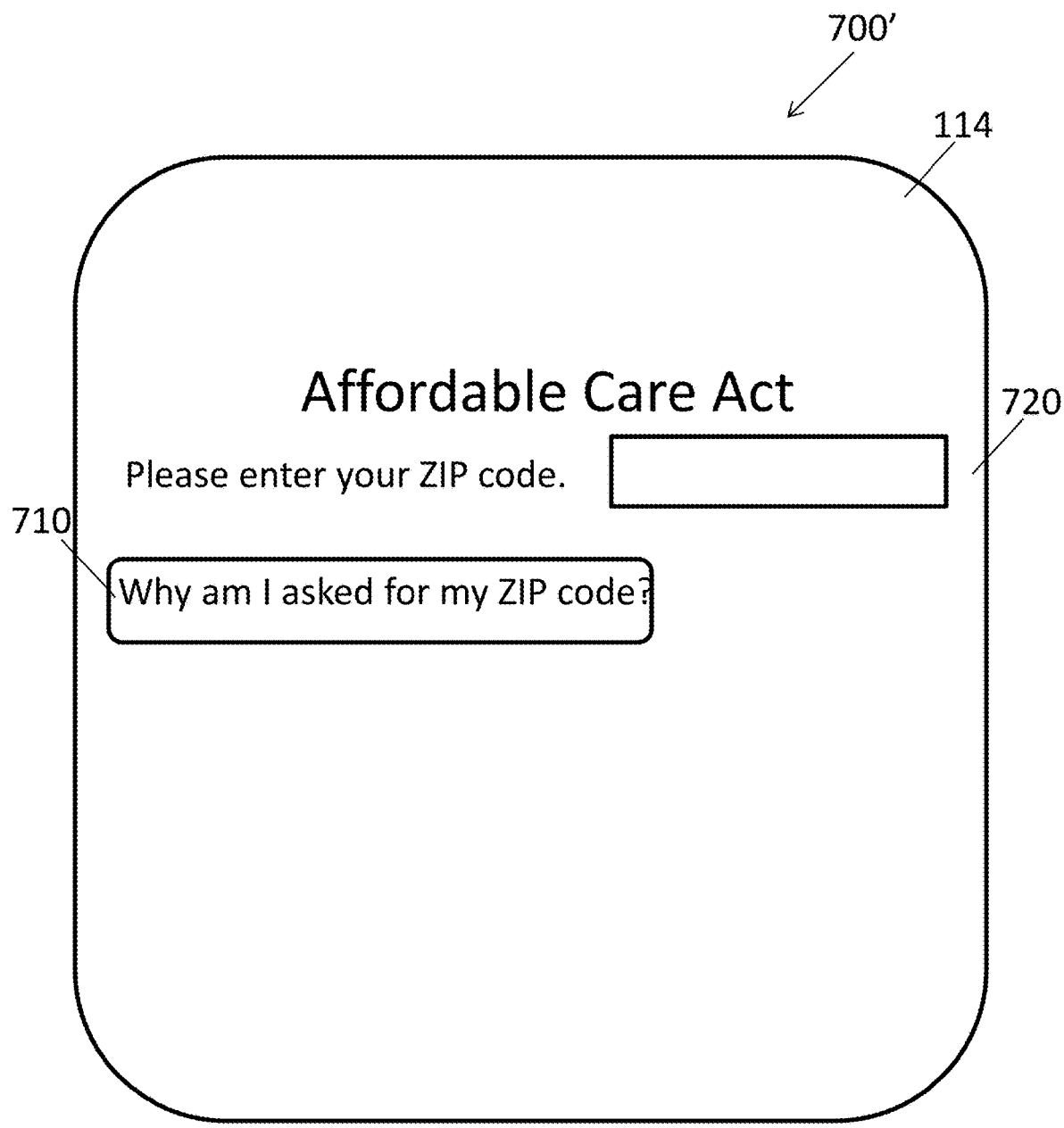
Figure 18:
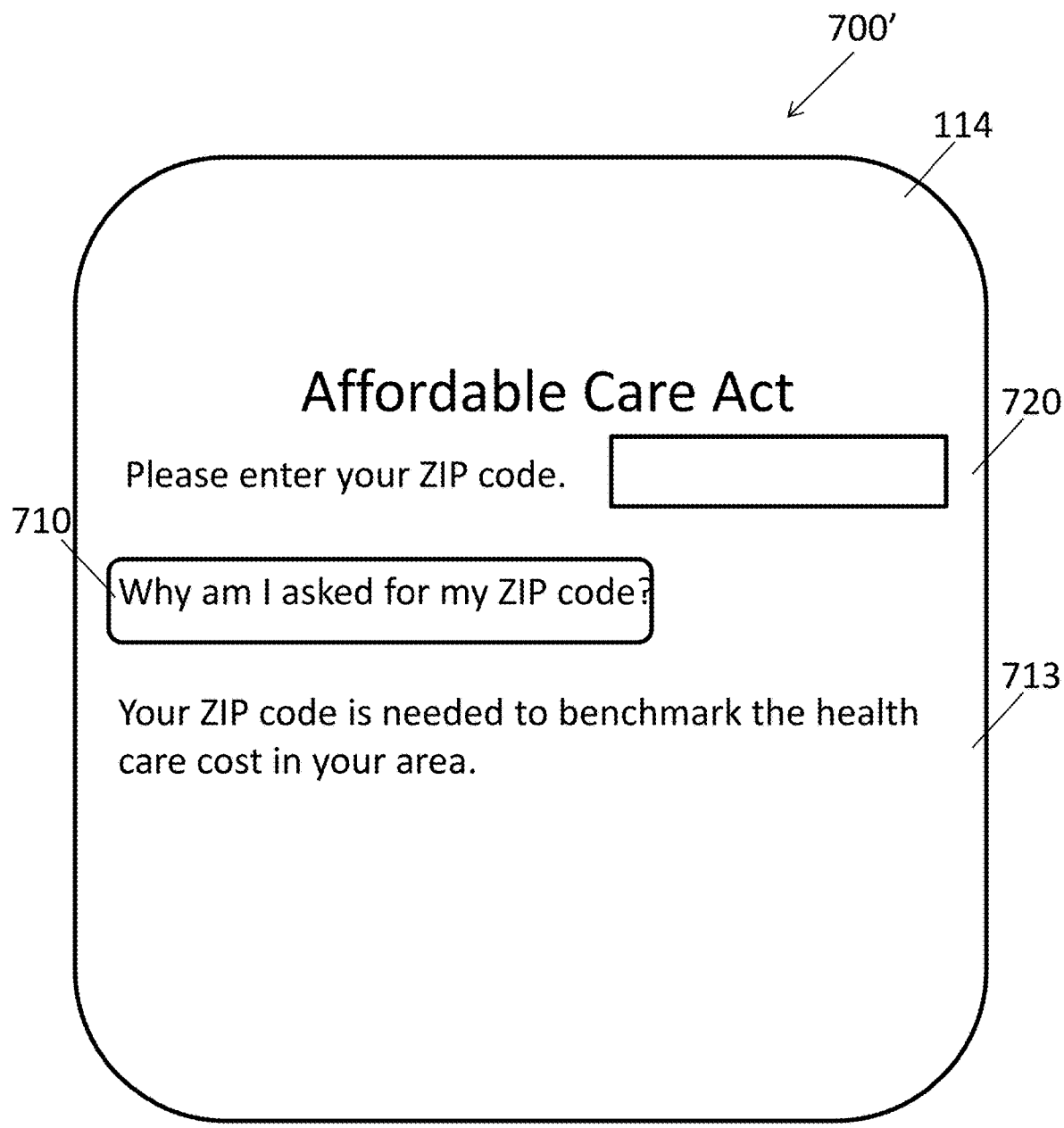

FIG. 17 illustrates another embodiment in which a selectable user interface object 710 is displayed in the user interface 700' without displaying the explanation asset 713. FIG. 18 illustrates the user interface 700' after the user interface objects 710 has been selected, resulting in display of the explanation asset 713 for a user who is curious about the question 720.

The electronic tax return preparation system 110 may also display or causes the display of some or all of the explanation assets 13 indexed to a node 20 across every completeness graph 12 in the electronic tax return preparation system 110. This embodiment provides more reasons for a particular question at the expense of a more verbose explanation. For instance the age of the taxpayer may be relevant to various tax concepts including earned income credit, 401(k) catch-up contribution, Social Security withdrawal, etc.

At step 428, which is parallel to steps 418 and 420, the electronic tax return preparation system 110 displays or causes the display of the question to the user as described above with respect to step 420.

The electronic tax return preparation system 110 may also display or causes the display of some or all of the explanation assets 13 indexed to a node 20 across every completeness graph 12 in the electronic tax return preparation system 110. This embodiment provides more reasons for a particular question at the expense of a more verbose explanation.

At step 422, electronic tax return preparation system 110 (e.g., the input/output module 120) receives an answer to the question. The answer can be provided by a user or other computer data sources 48 accessed by the system 110. In embodiments where the answer is provided without user input (e.g., from other computer data sources 48), the UI controller 80 may not display the explanation asset 13 in response to the non-binding suggestions 66.

After receiving the answer in step 422, electronic tax return preparation system 110 proceeds to step 424 wherein the system 110 analyzes (i.e., traverses) the completeness graphs 13 corresponding to the tax topic to determine their completeness. If the electronic tax return preparation system 110 determines that the completeness graphs 13 corresponding to the tax topic are complete, the system 110 proceeds to step 426 with the method 400 ends. If the electronic tax return preparation system 110 determines that one or more of the completeness graphs 13 corresponding to the tax topic are incomplete, the system 110 returns to step 412, where the system 110 analyzes the completeness graphs 12 to generate a set of questions related to the tax topic for the user.

The method 400 depicted in FIG. 13 allows an electronic tax return preparation system 110 to present questions with explanations where appropriate, while presenting only the questions when the system 110 determines that explanations are not needed. This balances the need for a streamlined tax data collection process and the need for explanation for questions that may cause a user/taxpayer to experience fear, uncertainty and doubt.

Figure 14:
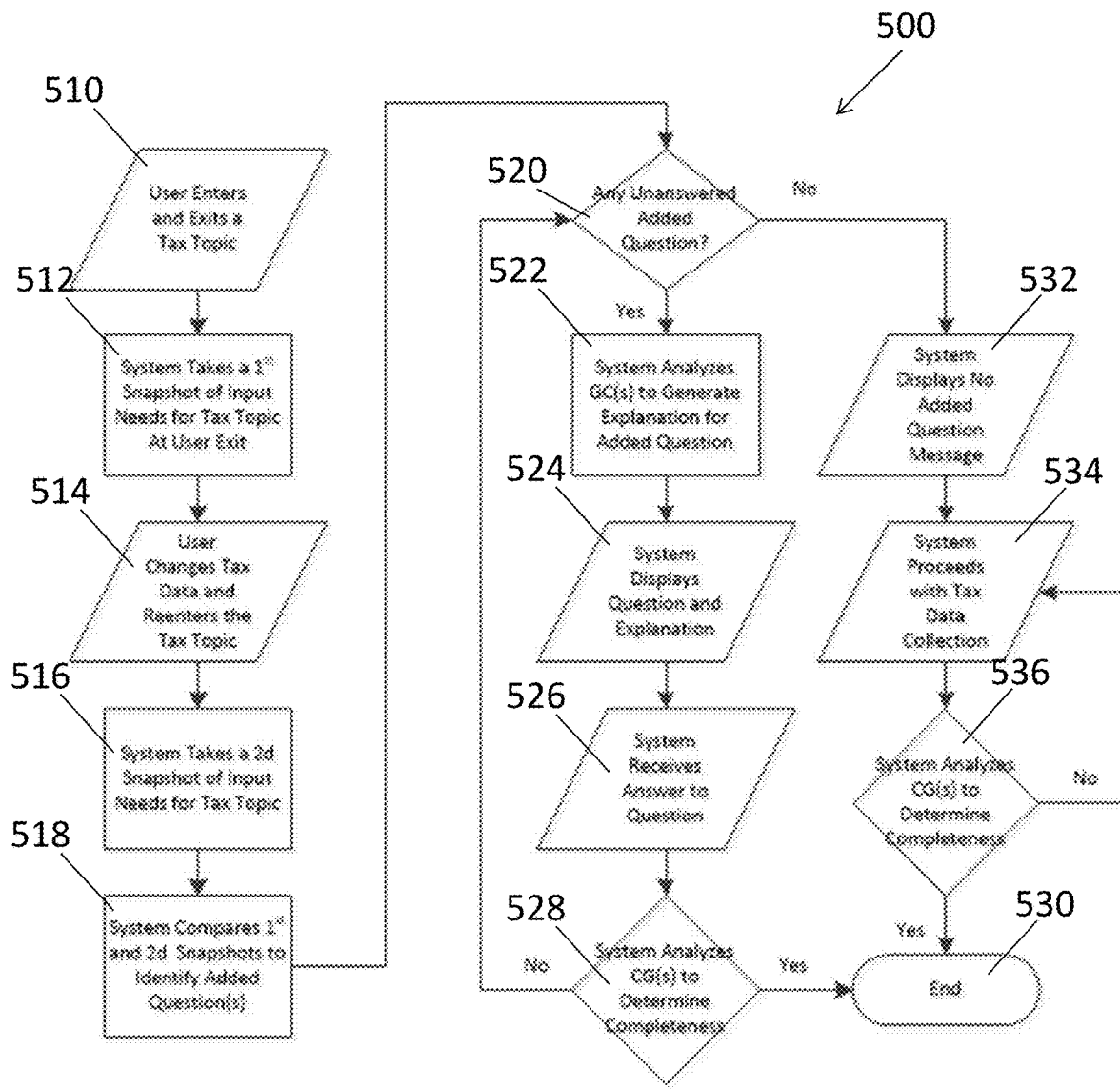
FIGS. 14 and 15 are flowcharts depicting computer-implemented methods/algorithms for generating and displaying explanations for added questions resulting from a user/taxpayer changing and/or modifying previously provided tax data according to two embodiments.

FIG. 14 depicts a method 500 of generating and displaying explanations for added questions resulting from a user/taxpayer changing and/or modifying previously provided tax data. This method 500 addresses changes in user expectations, especially those related to the completeness of the tax data collection process. By explaining that changes to tax data entered by the user resulted in additional questions, the tax return preparation system 110 can minimize user disappointment when presented with additional questions (e.g., in tax topics that were previously completed/closed).

At step 510, the user enters and more importantly exits a tax topic. The user may enter and exit the tax topic in a predetermined tax data collection order. In another embodiment, the user may enter and exit a tax topic by selecting from a variety of user interface objects/options presented to the user.

In step 512, the electronic tax return preparation system 110 (e.g. the completeness graph comparison engine 130) takes a first snapshot of the input needs for the tax topic when the user exits the tax topic in step 510. In one embodiment, a snapshot of the input needs for a tax topic includes all of the empty variables/nodes 20 in the completeness graphs 12 that must be obtained before a determination can be made with respect to the tax topic. In a special embodiment, where the tax topic is completed/closed, the first snapshot is an empty set.

At step 514, the user changes tax data, and reenters the tax topic corresponding to the first snapshot taken in step 512. For instance, the tax topic may have been the tax implications of the Affordable Care Act. The user may have previously identified two children and provided all of the information needed for the Affordable Care Act analysis in view of those children. At step 514, the user may navigate to the personal information section and indicate that they have a third child. Then the user may reenter the Affordable Care Act section of tax data entry.

At step 516, the completeness graph comparison engine 130 takes a second snapshot of the input needs for the tax topic that the user reentered in step 514. Snapshots of input needs for tax topics have been previously described with respect to step 512.

At step 518, the completeness graph comparison engine 130 compares the first and second snapshot to identify added questions, which correspond to empty variables/nodes 20 in the second snapshot but not in the first snapshot that must be obtained. For instance, in the Affordable Care Act example, information such as age, school status, residence, health coverage must be provided for the third child added in step 514.

At step 520, the completeness graph comparison engine 130 determines whether any unanswered questions were added to the second snapshot. When the completeness graph comparison engine 130 determines that new unanswered questions were added, the method 500 proceeds to step 522. When the completeness graph comparison engine 130 determines that no unanswered questions were added, the method 500 proceeds to step 532.

At step 522, the electronic tax return preparation system 110 (e.g., the explanation generation engine 128) analyzes an added question/node 20, the completeness graphs 12 corresponding to see added questions/node 20, and the changed tax data to generate an explanation asset 13 for the added question. For instance, the explanation asset 13 may be "Because you added a third child, we need information about that child for the Affordable Care Act analysis." In a more personalized embodiment, the explanation asset may use an explanation template. In such embodiments, the explanation asset may be "Because you added Becky, we need information about her for the Affordable Care Act analysis." The proper noun "Becky" and the pronoun "her" may be fields in the explanation template fillable with information from the personal information section. In another embodiment, the explanation asset 13 may be "Since the last time you visited the ACA topic we find you now have an additional dependent child John. We need to ask you a few questions regarding John's health insurance coverage for last year."

At step 524, the electronic tax return preparation system 110 displays or causes the display of the added question and the explanation asset corresponding to that question generated in step 522. As discussed above, the system 110 (e.g., the TLA 60) may generate one or more non-binding suggestions 66, which are communicated to the UI controller 80. The UI controller 80 and instructs the visual display 114 of the user computer 106 to display the added question and the explanation asset 13. Displaying an explanation asset 13 may include an intermediate step during which a user interface object that is selectable to cause display of the explanation asset 13 is displayed to the user.

The electronic tax return preparation system 110 may also display or causes the display of some or all of the explanation assets 13 indexed to a node 20 across every completeness graph 12 in the electronic tax return preparation system 110. This embodiment provides more reasons for a particular question at the expense of a more verbose explanation.

At step 526, electronic tax return preparation system 110 (e.g., the input/output module 120) receives an answer to the added question. The answer can be provided by a user or other computer data sources 48 accessed by the system 110. In embodiments where the answer is provided without user input (e.g., from other computer data sources 48), the UI controller 80 may not display the explanation asset 13 in response to the non-binding suggestions 66.

After receiving the answer in step 526, electronic tax return preparation system 110 proceeds to step 528 wherein the system 110 analyzes (i.e., traverses) the completeness graphs 13 corresponding to the tax topic to determine their completeness. If the electronic tax return preparation system 110 determines that the completeness graphs 13 corresponding to the tax topic are complete, the system 110 proceeds to step 530 with the method 500 ends. If the electronic tax return preparation system 110 determines that one or more of the completeness graphs 13 corresponding to the tax topic are incomplete, the system 110 returns to step 520, where the system 110 determines whether any other unanswered questions were added to the second snapshot in view of the newly provided tax data in step 526.

Steps 532 to 536 are parallel to steps 522 to 528, and the electronic tax return preparation system 110 enters step 532 when the system 110 (e.g., the completeness graph comparison engine 130) determines at step 520 that no unanswered questions were added. At step 532, the electronic tax return preparation system 110 generates and displays a "no added questions" message. For instance, an example of such a message may be "Affordable Care Act still looks great since you last visited this topic. If you want to make any changes, click continue."

At step 534, electronic tax return preparation system 110 proceeds with tax data collection for the tax topic.

At step 536, the electronic tax return preparation system 110 analyzes (i.e., traverses) the completeness graphs 13 corresponding to the tax topic to determine their completeness. If the electronic tax return preparation system 110 determines that the completeness graphs 13 corresponding to the tax topic are complete, the system 110 proceeds to step 530 with the method 500 ends. If the electronic tax return preparation system 110 determines that one or more of the completeness graphs 13 corresponding to the tax topic are incomplete, the system 110 returns to step 534, where the system 110 continues with tax data collection for the tax topic.

The method 500 depicted in FIG. 14 may be triggered whenever a user changes tax data and reenters a tax topic.

By generating and displaying explanations for added questions resulting from a user/taxpayer changing and/or modifying previously provided tax data, the method 500 addresses changes in user expectations. For example, by explaining that changes to tax data entered by the user caused additional questions to need answers, the tax return preparation system 110 reduces user disappointment when presented with those added questions.

Figure 15:
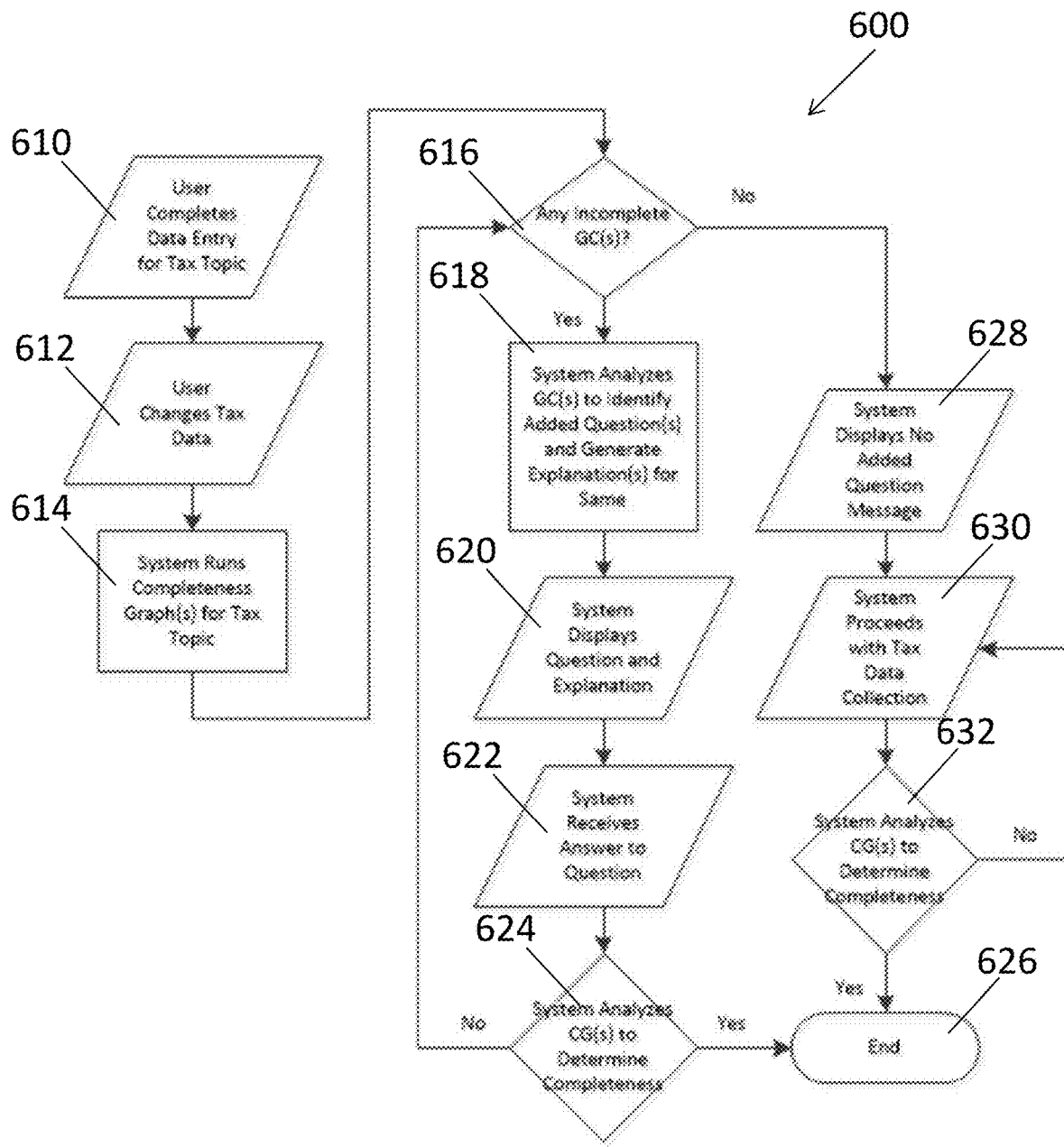

FIG. 15 depicts another method 600 of generating and displaying explanations for added questions resulting from a user/taxpayer changing and/or modifying previously provided tax data. This method 600 addresses changes in user expectations, in particular those related to the completeness of the tax data collection process. By explaining that changes to tax data entered by the user resulted in additional questions, the tax return preparation system 110 can minimize user disappointment when presented with additional questions in tax topics that were previously completed/closed.

At step 610, the user completes tax data entry for a particular tax topic. An example of a particular tax topic is the tax implications of the Affordable Care Act.

At step 612, the user changes some tax data. The user may have previously identified two children and provided all of the information needed for the Affordable Care Act analysis in view of those children. At step 612, the user may navigate to the personal information section and indicate that they have a third child.

At step 614, the electronic tax return preparation system 110 (e.g., the completeness graph comparison engine 130) traverses the completeness graphs 12 corresponding to the tax topic.

At step 616, electronic tax return preparation system 110 (e.g., the completeness graph comparison engine 130) determines whether any of the completeness graphs 12 corresponding to the tax topic are incomplete. If the system 110 determines that any of the completeness graphs 12 corresponding to the tax topic are incomplete, the system 110 proceeds to step 618. If the system 110 determines that none of the completeness graphs 12 corresponding to the tax topic are incomplete, the system 110 proceeds to step 628.

At step 618, the electronic tax return preparation system 110 (e.g., the completeness graph comparison engine 130) analyzes the completeness graphs 12 corresponding to the tax topic determined to be incomplete in step 616 to identify the questions added to the previously complete completeness graphs 12. Also at step 618, the electronic tax return preparation system 110 (e.g., the explanation generation engine 128) analyzes an added question/node 20, the completeness graphs 12 corresponding to see added questions/node 20, and the changed tax data to generate an explanation asset 13 for the added question.

Step 620, electronic tax return preparation system 110 displays or causes the display of the added question and the explanation asset corresponding to that question generated in step 618. As discussed above, the system 110 (e.g., the TLA 60) may generate one or more non-binding suggestions 66, which are communicated to the UI controller 80. The UI controller 80 and instructs the visual display 114 of the user computer 106 to display the added question and the explanation asset 13. Displaying an explanation asset 13 may include an intermediate step during which a user interface object that is selectable to cause display of the explanation asset 13 is displayed to the user.

The electronic tax return preparation system 110 may also display or causes the display of some or all of the explanation assets 13 indexed to a node 20 across every completeness graph 12 in the electronic tax return preparation system 110. This embodiment provides more reasons for a particular question at the expense of a more verbose explanation.

At step 622, electronic tax return preparation system 110 (e.g., the input/output module 120) receives an answer to the added question. The answer can be provided by a user or other computer data sources 48 accessed by the system 110. In embodiments where the answer is provided without user input (e.g., from other computer data sources 48), the UI controller 80 may not display the explanation asset 13 in response to the non-binding suggestions 66.

After receiving the answer in step 622, electronic tax return preparation system 110 proceeds to step 624 wherein the system 110 analyzes (i.e., traverses) the completeness graphs 13 corresponding to the tax topic to determine their completeness. If the electronic tax return preparation system 110 determines that the completeness graphs 13 corresponding to the tax topic are complete, the system 110 proceeds to step 626 with the method 600 ends. If the electronic tax return preparation system 110 determines that one or more of the completeness graphs 13 corresponding to the tax topic are incomplete, the system 110 returns to step 616, where the system 110 determines whether any completeness graphs 12 corresponding to the tax topic are incomplete in view of the newly provided tax data in step 622.

Steps 628 to 632 are parallel to steps 618 to 622, and the electronic tax return preparation system 110 enters step 628 when the system 110 (e.g., the completeness graph comparison engine 130) determines at step 616 that no completeness graphs 12 corresponding to the tax topic are incomplete. At step 628, the electronic tax return preparation system 110 generates and displays a "no added questions" message. For instance, an example of such a message may be "Affordable Care Act still looks great since you last visited this topic. If you want to make any changes, click continue."

At step 630, electronic tax return preparation system 110 proceeds with tax data collection for the tax topic.

At step 632, the electronic tax return preparation system 110 analyzes (i.e., traverses) the completeness graphs 13 corresponding to the tax topic to determine their completeness. If the electronic tax return preparation system 110 determines that the completeness graphs 13 corresponding to the tax topic are complete, the system 110 proceeds to step 626 with the method 600 ends. If the electronic tax return preparation system 110 determines that one or more of the completeness graphs 13 corresponding to the tax topic are incomplete, the system 110 returns to step 630, where the system 110 continues with tax data collection for the tax topic.

The method 600 depicted in FIG. 15 may be triggered whenever a user changes tax data.

By generating and displaying explanations for questions added to previously completed tax topics because a user/taxpayer changed and/or modified previously provided tax data, the method 600 addresses changes in user expectations. For example, by explaining that changes to tax data entered by the user caused additional questions to be added to a previously completed tax topic, the tax return preparation system 110 reduces user disappointment when presented with those added questions.

The embodiments described herein provide explanations corresponding to (1) questions for which an explanation may improve the user experience (e.g., questions seemingly misplaced and/or unreasonable questions for tax topics); and (2) questions added as a result of modified user tax data. Providing such explanations reduces user fear, uncertainty and doubt, thereby improving the tax data collection user experience. For instance, providing such explanations results in name more dynamic experience that is personalized based on the taxpayer's needs.

The embodiments described herein improve the efficiency of computing devices used for streamlining the provision of explanations for tax questions and added tax questions. The use of completeness graphs, explanation assets and schema described herein, increases processing efficiency and reduces memory footprint size. The embodiments described herein address the computer centric issue of explaining changes to completeness graphs using various computing engines that traverse completeness graph data structures. The embodiments described herein include transforming existing and added nodes in completeness graphs into explanations regarding those nodes. The embodiments described herein also improve the technical fields of information storage, information processing, and computer human interactions.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 220 performs steps or executes program instructions 212 within memory 210 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

Although particular embodiments have been shown and described, it should be understood that the above discussion is not intended to limit the scope of these embodiments. While embodiments and variations of the many aspects of embodiments have been disclosed and described herein, such disclosure is provided for purposes of explanation and illustration only. Thus, various changes and modifications may be made without departing from the scope of the claims.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A method implemented by a server computing device, the server computing device comprising a processor and a memory, the server computing device executing an electronic tax return preparation system to generate and present textual explanations for added questions resulting from modified tax data on a user interface of a user computing device in communication with the server computing device over a network, the electronic tax return preparation system being stored at least partially as computer-executable instructions in the memory of the server computing device, the method comprising executing the instructions by the processor to cause the server computing device to perform:
by executing a completeness graph comparison engine of the electronic tax return preparation system,
in response to a first user operation of exiting a tax topic, determining a first snapshot of first input needs for a completeness graph corresponding to the tax topic and first tax data associated with a user, wherein the completeness graph represents a graph data structure stored in the memory and comprises a plurality of interconnected functional nodes and variables representing questions for completing a tax topic determination and wherein the first snapshot of the first input needs corresponds to a first set of variables required for completing the tax topic determination based on the first tax data;
receiving second tax data indicative of the modified tax data comprising changes made by the user on the first tax data via the user computing device;
in response to a second user operation of reentering the tax topic, determining a second snapshot of second input needs for the completeness graph corresponding to the tax topic and the second tax data, wherein the second snapshot of the second input needs corresponds to a second set of required variables for completing the tax topic determination based on the second tax data;
comparing the first and second snapshots to identify an added variable in the completeness graph corresponding to the tax topic, the added variable being in a second set of the required variables but not in the first set of the required variables;
sending the added variable to an explanation engine and a user interface controller;
by executing an explanation engine of the electronic tax return preparation system, analyzing the completeness graph and the second tax data to generate a textual explanation for the added variable, the explanation generation engine comprising a natural language generator executable by the processor of the server computing device for generating the textual explanation for the added variable;
by executing the user interface controller of the electronic tax return preparation system, generating a tax question corresponding to the added variable; and
presenting the tax question and the textual explanation to a user on the user interface of the user computing device via the network.

2. The method of claim 1, wherein generating the textual explanation comprises analyzing the completeness graph, the modified tax data, and the added variable.

3. The method of claim 1, wherein the completeness graph is a logical tree, and wherein the added variable is represented by an empty node in the logical tree.

4. The method of claim 3, wherein the textual explanation is indexed to the node in the logical tree.

5. The method of claim 1, wherein the explanation textual explanation is a natural language phrase.

6. The method of claim 1, wherein the textual explanation is a template including another variable.

7. The method of claim 1, wherein presenting the textual explanation comprises presenting a user interface object selectable to trigger displaying the explanation asset.

8. The method of claim 1, wherein presenting the textual explanation comprises displaying the textual explanation without user input.

9. The method of claim 1, wherein the first snapshot is taken when the user exits the tax topic and the completeness graph is completed based on the first tax data.

10. The method of claim 9, wherein the second snapshot is taken when the user enters the tax topic after exiting the tax topic associated the completed completeness graph.

11. A computing system, the computing system comprising:
a server computing device including a memory and a processor; and
a user computing device in communication with the server computing device over a network, the server computing device executing an electronic tax return preparation system to generate and present textual explanations for added tax questions resulting from modified tax data on a user interface of the user computing device, the electronic tax return preparation system being stored at least partially in the memory of the server computing device, the memory storing computer-executable instructions which are executed by the processor of the server computing device to cause the server computing device to perform:
a computing device having a completeness graph engine, an explanation engine, and a user interface,
in response to a first user operation of exiting a tax topic and by executing a completeness graph engine, determining a first snapshot of first input needs for a completeness graph corresponding to the tax topic and first tax data, wherein the completeness graph represents a graph data structure stored in the memory and comprises a plurality of interconnected functional nodes and variables representing questions for completing a tax topic determination and wherein the first snapshot of the first input needs corresponds to a first set of variables required for completing the tax topic determination based on the first tax data;
receiving second tax data indicative of the modified tax data comprising changes made by the user on the first tax data via the user computing device;
in response to a second user operation of modifying the first tax data and reentering the tax topic, determining a second snapshot of second input needs for the completeness graph corresponding to the tax topic, wherein the second snapshot corresponds to a second set of required variables for completing the tax topic determination based on the second tax data;
comparing the first and second snapshots to identify an added variable in the completeness graph corresponding to the tax topic, the added variable being in a second set of the required variables but not in the first set of the required variables;
sending the added variable to an explanation engine and a user interface controller;
by executing the explanation engine, analyzing the completeness graph and the modified tax data to generate a textual explanation for the added variable, the explanation engine comprising a natural language generator executable by the process of the server computing device for generating the textual explanation for the added variable;
by executing the user interface controller, generating a tax question corresponding to the added variable; and
presenting the tax question and the textual explanation to a user on the user interface of the user computing device.

12. The system of claim 11, wherein generating the textual explanation comprises analyzing the completeness graph, the modified tax data, and the added variable.

13. The system of claim 11, wherein the completeness graph is a logical tree, and wherein the added variable is represented by an empty node in the logical tree.

14. The system of claim 11, wherein the textual explanation is indexed to the node in the logical tree.

15. The system of claim 11, wherein the textual explanation is a natural language phrase.

16. The system of claim 11, wherein the textual explanation is a template including another variable.

17. The system of claim 11, wherein presenting the textual explanation comprises presenting a user interface object selectable to trigger displaying the textual explanation.

18. The system of claim 11, wherein presenting the textual explanation comprises displaying the textual explanation without user input.

19. The system of claim 11, wherein the first snapshot is taken when the user exits the tax topic and the completeness graph is completed based on the first tax data.

20. The system of claim 19, wherein the second snapshot is taken when the user enters the tax topic after exiting the tax topic and the completeness graph is completed based on the first tax data.

* * * * *